United States Patent
Nakajima

(10) Patent No.: US 9,288,677 B2
(45) Date of Patent: Mar. 15, 2016

(54) COMMUNICATION SYSTEM, COMMUNICATION APPARATUS AND METHOD FOR SETTING COMMUNICATION PARAMETERS OF THE APPARATUS

(71) Applicant: CANON KABUSHIKI KAISHA, Tokyo (JP)

(72) Inventor: Takafumi Nakajima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 14/195,958

(22) Filed: Mar. 4, 2014

(65) Prior Publication Data
US 2014/0189824 A1 Jul. 3, 2014

Related U.S. Application Data

(63) Continuation of application No. 11/675,816, filed on Feb. 16, 2007, now Pat. No. 8,699,475.

(30) Foreign Application Priority Data

Feb. 23, 2006 (JP) ................................ 2006-046969

(51) Int. Cl.
*H04W 12/08* (2009.01)
*H04W 8/26* (2009.01)
*H04W 84/12* (2009.01)
*H04W 12/02* (2009.01)
*H04W 12/06* (2009.01)
(Continued)

(52) U.S. Cl.
CPC .............. *H04W 12/08* (2013.01); *H04W 8/265* (2013.01); *H04W 12/02* (2013.01); *H04W 12/06* (2013.01); *H04W 60/00* (2013.01); *H04W 76/02* (2013.01); *H04W 84/12* (2013.01)

(58) Field of Classification Search
CPC ..... H04W 4/005; H04W 4/008; H04W 76/00; H04W 76/02–76/068; H04W 84/12; H04W 92/10
See application file for complete search history.

(56) References Cited

U.S. PATENT DOCUMENTS

| | | | |
|---|---|---|---|
| 6,782,260 B2 * | 8/2004 | Nakakita | H04L 63/08 380/247 |
| 8,014,804 B2 | 9/2011 | Banerjea | |
| 2002/0118664 A1 | 8/2002 | Ishibashi et al. | |

(Continued)

FOREIGN PATENT DOCUMENTS

| | | |
|---|---|---|
| JP | 2002-374261 A | 12/2002 |
| JP | 2003-218875 A | 7/2003 |

(Continued)

*Primary Examiner* — San Htun
(74) *Attorney, Agent, or Firm* — Carter, DeLuca, Farrell & Schmidt, LLP

(57) ABSTRACT

A wireless terminal which newly joins a wireless communication system transmits a message containing its identification data to an access point in the wireless communication system at a communication parameter setting start. Upon receiving the message, the access point determines whether or not the wireless terminal has been registered. If it is determined that the wireless terminal has not been registered, the access point determines whether or not the wireless terminal is a setting target device of communication parameters based on the identification data contained in the message. If it is determined that the wireless terminal is a setting target device, the access point sets communication parameters for the wireless terminal.

18 Claims, 28 Drawing Sheets

(51) Int. Cl.
*H04W 60/00* (2009.01)
*H04W 76/02* (2009.01)

(56) References Cited

U.S. PATENT DOCUMENTS

| | | |
|---|---|---|
| 2004/0076300 A1 | 4/2004 | Ishidoshiro |
| 2004/0100973 A1* | 5/2004 | Prasad ................. H04W 12/08 370/401 |
| 2004/0259552 A1* | 12/2004 | Ihori ..................... H04W 28/18 455/445 |
| 2005/0048953 A1 | 3/2005 | Ohara |
| 2005/0050318 A1* | 3/2005 | Alone ................. H04L 63/0428 713/155 |
| 2005/0135310 A1 | 6/2005 | Cromer et al. |
| 2005/0160274 A1 | 7/2005 | Yukimatsu et al. |
| 2005/0201557 A1 | 9/2005 | Ishidoshiro |
| 2006/0039339 A1 | 2/2006 | Cohen |
| 2006/0268743 A1 | 11/2006 | Yoshida |
| 2008/0043686 A1* | 2/2008 | Sperti ..................... G06F 21/55 370/338 |
| 2008/0070574 A1 | 3/2008 | Vikberg et al. |

FOREIGN PATENT DOCUMENTS

| | | |
|---|---|---|
| JP | 2003-338821 A | 11/2003 |
| JP | 2004-215232 A | 7/2004 |
| JP | 2004-320162 A | 11/2004 |
| JP | 2005-223745 A | 8/2005 |

* cited by examiner

FIG. 4

| FIRST COMMUNICATION PARAMETERS 111 ||
|---|---|
| SSID | SSID = ABC |
| ENCRYPTION SCHEME | WEP |
| WEP ENCRYPTION KEY | zxfgmtqlc |
| WEP KEY LENGTH | 128bit |
| Authentication | Open |

FIG. 13A

| FIRST COMMUNICATION PARAMETERS 111 | |
|---|---|
| SSID | SSID = ABC |
| ENCRYPTION SCHEME | WEP |
| WEP ENCRYPTION KEY | zxfgmtqlc |
| WEP KEY LENGTH | 128bit |
| Authentication | Open |

FIG. 13B

| SECOND COMMUNICATION PARAMETERS 1008 | |
|---|---|
| SSID | SSID = DEF |
| ENCRYPTION SCHEME | WEP |
| WEP ENCRYPTION KEY | nkrcopdwg |
| WEP KEY LENGTH | 64bit |
| Authentication | Open |

FIG. 14

| DEVICE | PRESENT TIME INDICATED BY REAL-TIME CLOCK |
|---|---|
| WIRELESS TERMINAL 101 | 12 : 00 : 50 |
| ACCESS POINT 104 | 12 : 01 : 03 |
| ACCESS POINT 1001 | 12 : 00 : 30 |

FIG. 15

| DEVICE | SSID | TIME DIFFERENCE FROM WIRELESS TERMINAL 101 |
|---|---|---|
| ACCESS POINT 104 | ABC | +00 : 00 : 13 |
| ACCESS POINT 1001 | DEF | −00 : 00 : 20 |

F I G. 27
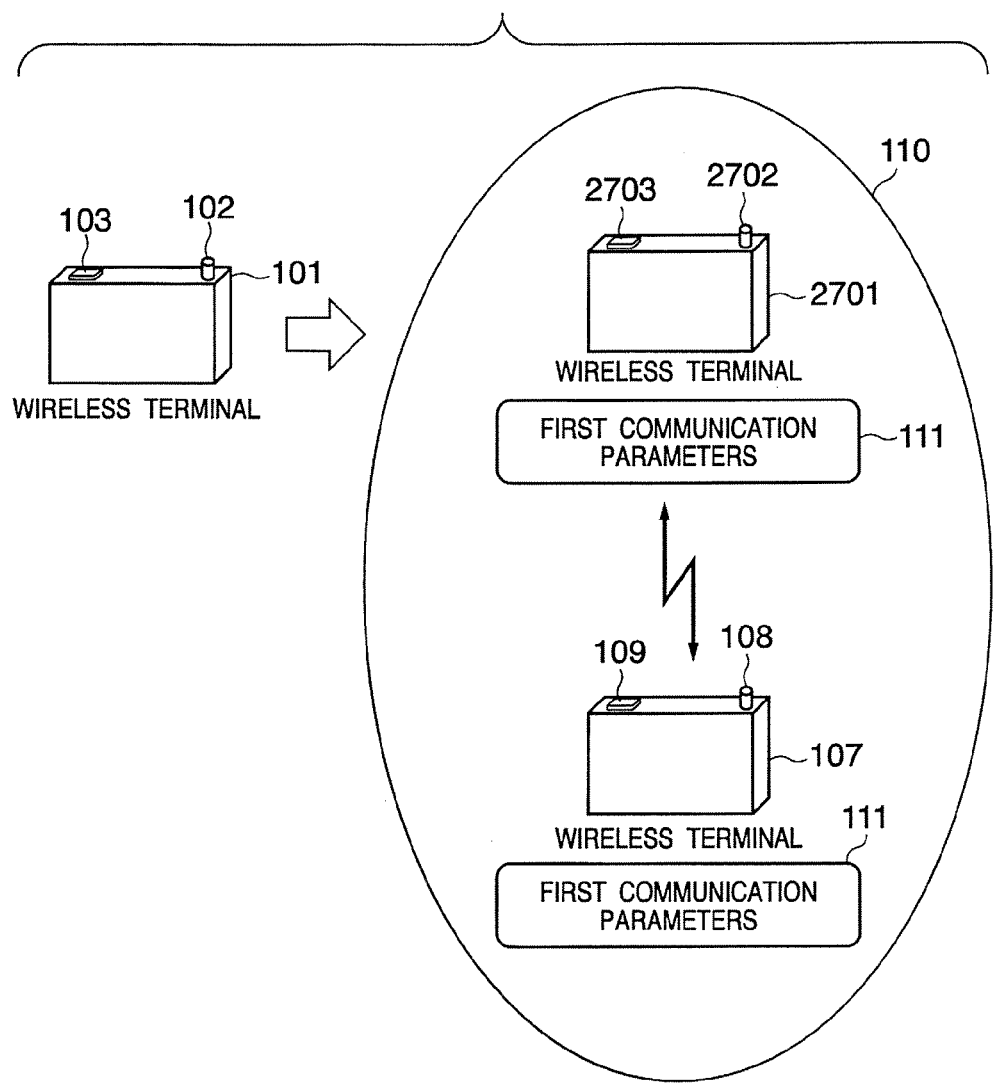

COMMUNICATION SYSTEM, COMMUNICATION APPARATUS AND METHOD FOR SETTING COMMUNICATION PARAMETERS OF THE APPARATUS

CROSS REFERENCE TO RELATED APPLICATIONS

This application is a continuation of U.S. patent application Ser. No. 11/675,816, filed Feb. 16, 2007, which claims the benefit of and priority to Japanese Application No. 2006-46969 filed Feb. 23, 2006, the entire contents of each of which are hereby incorporated by reference herein in their entirety.

BACKGROUND OF THE INVENTION

1. Field of the Invention

The present invention relates to a communication system, communication apparatus and method for setting communication parameters.

2. Description of the Related Art

To conduct communication via wireless LAN, it is necessary to set wireless LAN communication parameters (such as a network identifier called an SSID (Service Set ID), encryption key, authentication method and authentication key) among devices which conduct communications. Techniques have been proposed for simplifying the setting of communication parameters, which has been troublesome for users. For example, a method for setting communication parameters to be used between an access point and a station by transferring the parameters automatically from the access point to the station has been implemented into a product.

Also, Japanese Patent Laid-Open No. 2004-215232 (reference 1) describes a technique for setting communication parameters (encryption key) via wireless communication.

Also, Japanese Patent Laid-Open No. 2003-218875 (reference 2) describes a technique in which communication parameters are transmitted after being encrypted by an encryption method (WEP or common key, and devices which receive the communication parameters decrypt and set the parameters.

With the communication parameter setting methods described in references 1 and 2, when setting communication parameters for a device in operation (in communication), the operation must be stopped once before setting the communication parameters in order to specify the setting target device and to prevent leakage of the communication parameters.

In contrast, Japanese Patent Laid-Open No. 2003-338821 discloses a method for setting communication parameters without stopping the operation of a device in operation. This method uses default communication parameters to set operating communication parameters for a terminal which newly joins a network.

The conventional technique described above uses the default communication parameters for communication parameter transfer. Consequently, the transmitted communication parameters may be intercepted by malicious third parties (devices). Also, during communication parameter setting, operating communication parameters are switched to the default communication parameters, making it necessary for the communicating devices to perform the switching.

SUMMARY OF THE INVENTION

The present invention has as an object to solve the problems with the conventional techniques described above.

It is a feature of the present invention to make it easier for communication devices which newly join a network to set communication parameters.

According to an aspect of the present invention there is provided a communication system comprising:

a first communication apparatus which newly joins the communication system; and a second communication apparatus which has joined the communication system, wherein the first communication apparatus comprising:

a transmission unit configured to transmit a message containing identification data of the first communication apparatus to the second communication apparatus, in response to a communication parameter setting start, the second communication apparatus comprising:

a registration determination unit configured to determine whether or not the first communication apparatus which transmitted the message has been registered;

a determination unit configured to determine whether or not the first communication apparatus is a setting target device of communication parameters based on the identification data contained in the message; and a parameter setting unit configured to set communication parameters for the first communication apparatus based on the determination made by the registration determination unit and the determination made by the determination unit.

According to an aspect of the present invention there is provided a method for setting communication parameters among a plurality of communication apparatus, comprising:

a transmission step of transmitting a message containing identification data of a first communication apparatus to a second communication apparatus in response to a communication parameter setting start on the first communication apparatus;

a registration determination step of determining on the second communication apparatus whether or not the first communication apparatus which transmitted the message has been registered;

a determination step of determining whether or not the first communication apparatus is a setting target device of communication parameters based on the identification data contained in the message; and a parameter setting step of setting communication parameters for the first communication apparatus based on the determination made in the registration determination step and the determination made in the determination step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating a concrete example of first communication parameters according to the first embodiment;

FIGS. 13A and 13B are diagrams illustrating parameter tables of first communication parameters (FIG. 13A) and second communication parameters (FIG. 13B) according to the second embodiment;

FIG. 14 is a diagram showing an example of the present time indicated by respective real-time clocks of a wireless terminal and access points according to the second embodiment;

FIG. 15 is a diagram illustrating an example of a synchronized timetable possessed by the wireless terminal according to the second embodiment;

FIG. 27 is a diagram showing a configuration of a wireless communication system according to an eleventh embodiment of the present invention.

DESCRIPTION OF THE EMBODIMENTS

Preferred embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

<First Embodiment>

Figure 1:
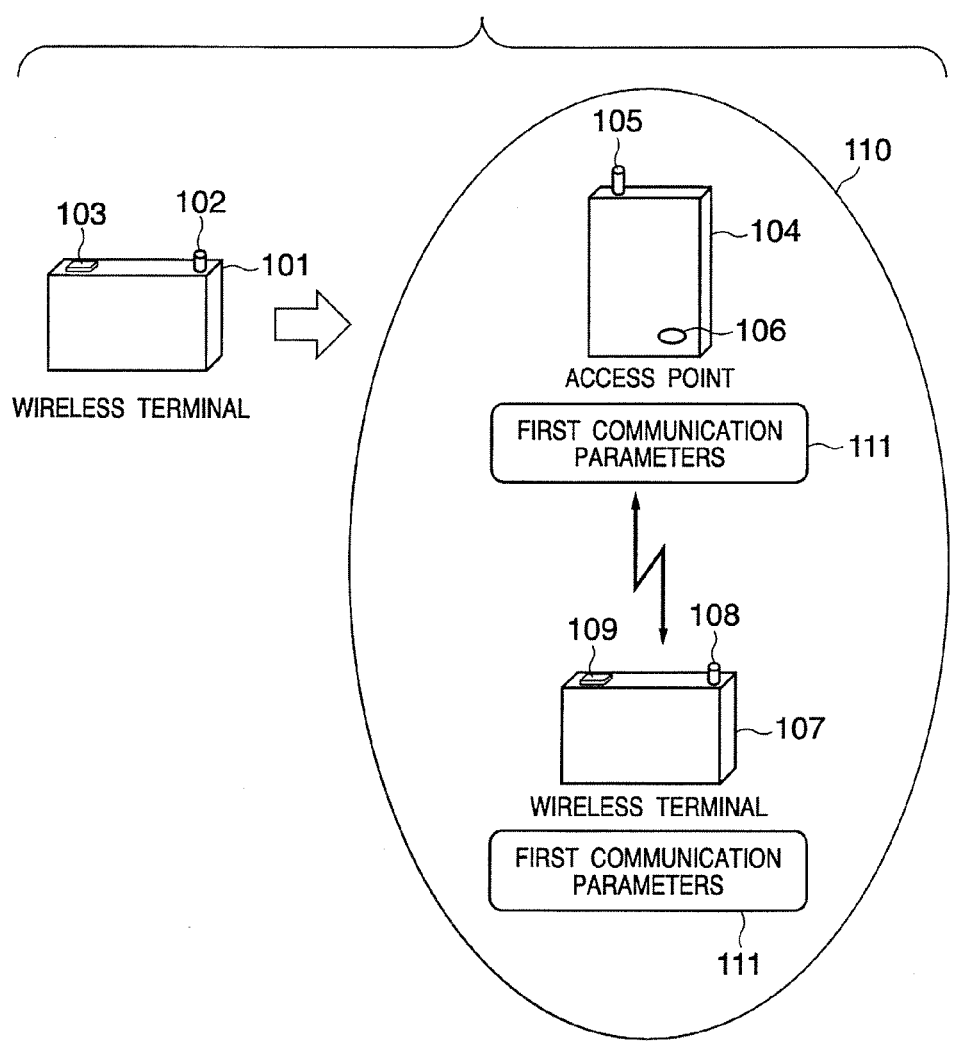
FIG. 1 is a schematic diagram of a wireless communication system according to a first embodiment of the present invention.

FIG. 1 is a schematic diagram of a wireless communication system according to a first embodiment of the present invention.

The wireless communication system includes an access point 104, wireless terminal 101, and wireless terminal 107 which conduct wireless LAN communication compliant with IEEE 802.11. The access point 104 is equipped with a wireless communication unit 105 and included in a wireless LAN. A button 106 is used to give a command to start automatic setting of communication parameters. When the button 106 is pressed, the access point 104 starts automatic setting of the communication parameters. The wireless terminal 101 is equipped with a wireless communication unit 102. When a button 103 is pressed, the wireless terminal 101 starts an auto-setting process of communication parameters. Similarly, the wireless terminal 107 is equipped with a wireless communication unit 108 and when a button 109 is pressed, the wireless terminal 107 starts an auto-setting process of communication parameters.

Here, the access point 104 forms a first wireless network 110 using first communication parameters 111. Also, the wireless terminal 107 is communicating with the access point 104 by setting the first communication parameters 111. That is, the access point 104 decides that the wireless terminal 107 has been registered with the first wireless network 110.

On the other hand, the wireless terminal 101 is a newly joining terminal of the first wireless network 110. That is, the access point 104 decides that the wireless terminal 101 has not been registered with the first wireless network 110. The access point 104 and wireless terminal 101 has an encryption key for registration as a secret key and a public key, respectively.

Figure 2:
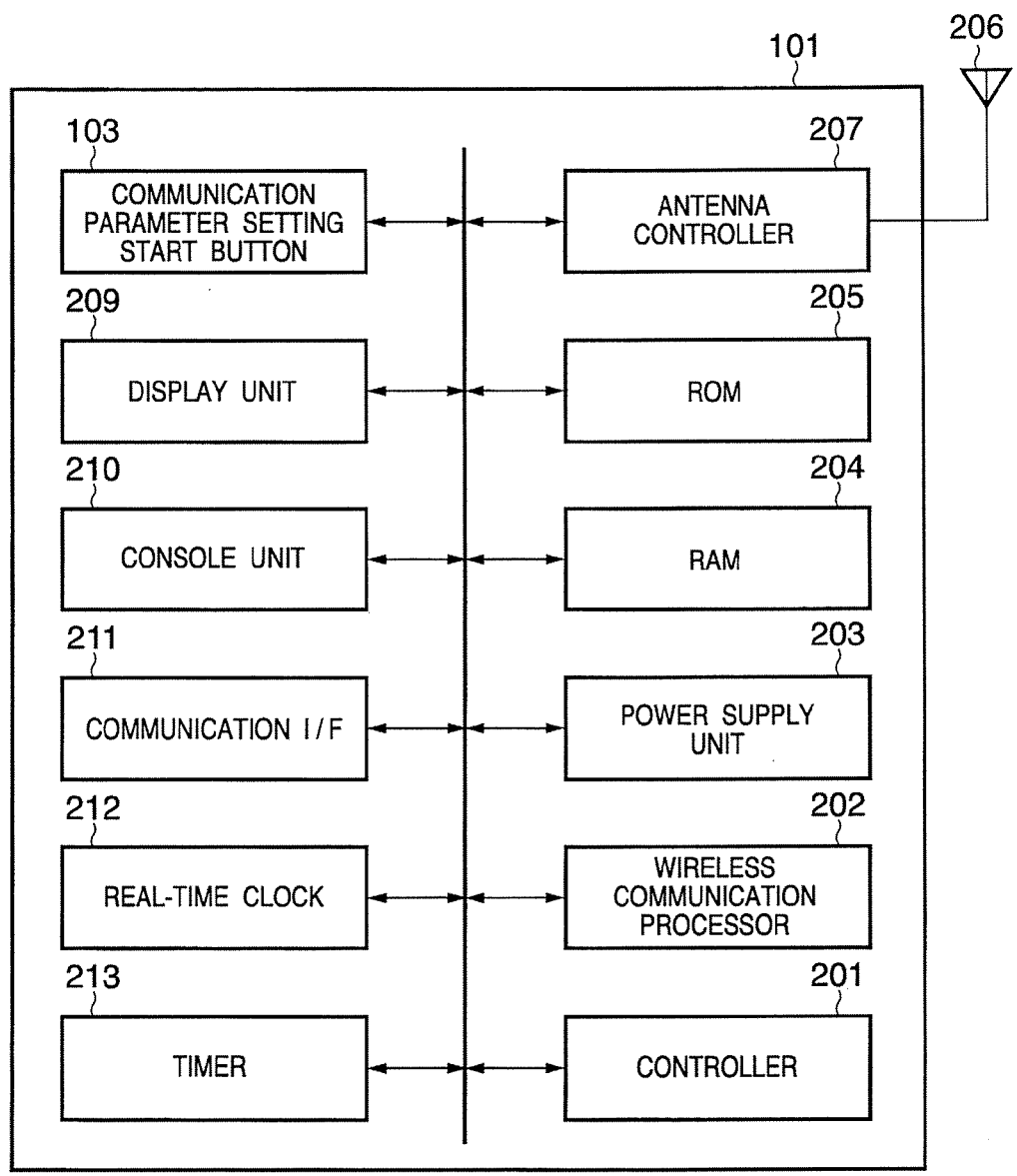
FIG. 2 is a block diagram showing a configuration of a wireless terminal according to the first embodiment.

FIG. 2 is a block diagram showing a configuration of the wireless terminal 101 according to the first embodiment.

A controller (CPU) 201 controls overall operation of the wireless terminal 101. A wireless communication processor 202 controls communication with the wireless LAN. A power supply unit 203 supplies electric power to the wireless terminal 101. A RAM 204 is used to temporarily store various data. A ROM 205 stores programs (control instructions) executed by the controller 201, various data, and the like. An antenna 206 and antenna controller 207 are components of the wireless communication unit 102. The button 103 is used to start setting the communication parameters, i.e., it is used to start the auto-setting process of the communication parameters. A display unit 209 is a liquid crystal display or the like and is used to display operator messages and the like. A console unit 210 contains various keys and buttons and is operated by an operator. A communication interface (I/F) 211 is used for communication other than wireless communication. It may be, for example, a USB, IEEE 1394, or other interface. A real-time clock 212 keeps time and informs the controller 201 of the present time. A timer 213 measures the elapsed time after instructions are received from the controller 201 and when a specified time elapses, it informs the controller 201 using an interrupt or the like.

The wireless terminal 107 has the same configuration as the wireless terminal 101, and thus a description thereof will be omitted.

Figure 3:
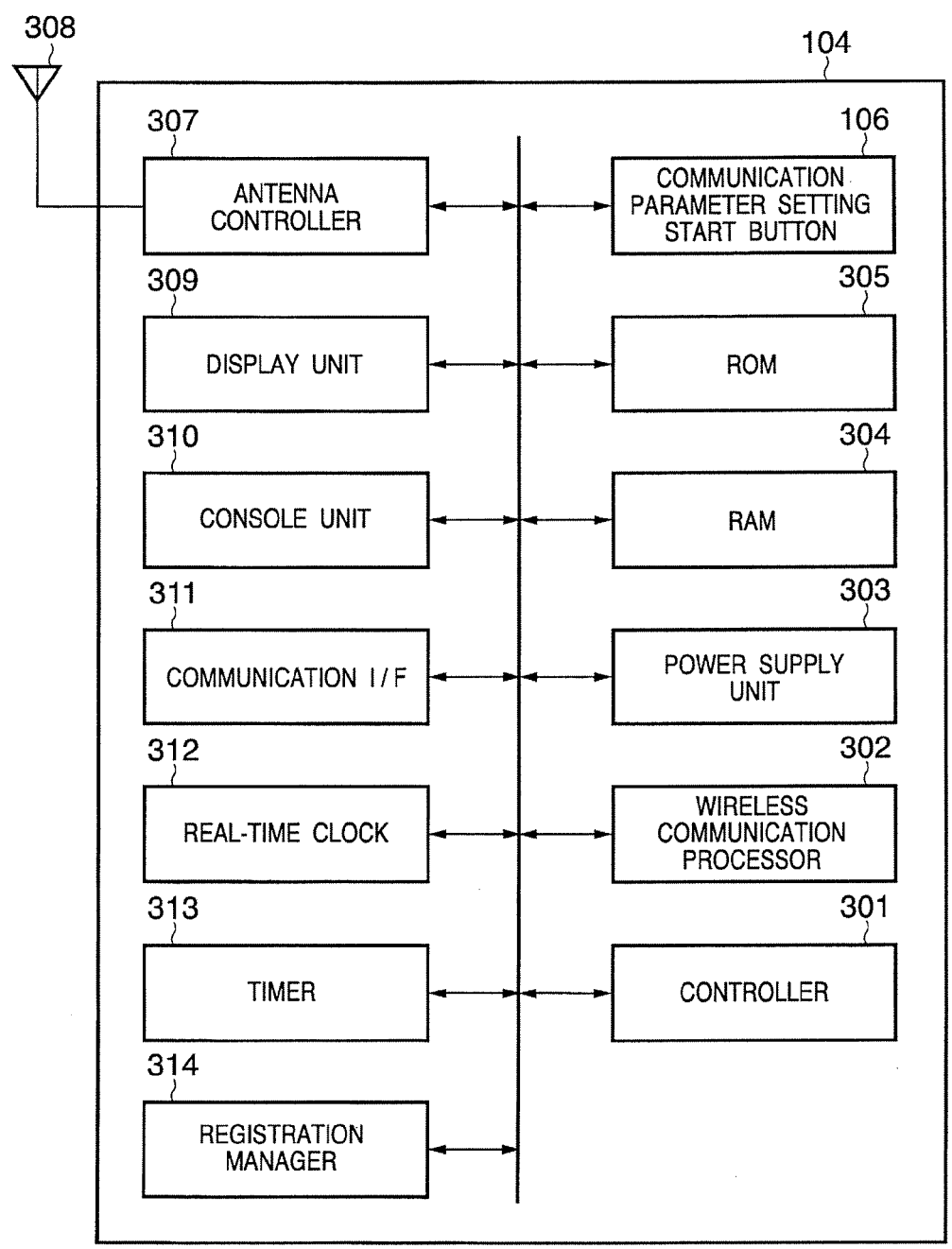
FIG. 3 is a block diagram showing a configuration of an access point according to the first embodiment.

FIG. 3 is a block diagram showing a configuration of the access point 104 according to the first embodiment.

A controller 301 controls overall operation of the access point 104. A wireless communication processor 302 controls communication via the wireless LAN. A power supply unit 303 supplies electric power to the access point 104. A RAM 304 is used to temporarily store various data. A ROM 305 stores programs (control instructions) executed by the controller 301, various data, and the like. The button 106 is used to start setting the communication parameters, i.e., it is used to start a communication parameter setting process. An antenna controller 307 and antenna 308 are components of the wireless communication unit 105. A display unit 309 is a liquid crystal display or the like and is used to display operator messages and the like. A console unit 310 contains various keys and buttons and is operated by an operator. A communication interface (I/F) 311 is used for communication other than wireless communication.

It may be, for example, a USB, IEEE 1394, or other interface. A real-time clock 312 keeps time and informs the controller 301 of the present time. A timer 313 measures the elapsed time after instructions are received from the controller 301, and when a specified time elapses, it informs the controller 301 using an interrupt or the like. A registration manager 314 stores and manages information about devices registered with the access point 104.

The wireless terminals and access points according to the other embodiments described below have the same configurations as those shown in FIGS. 2 and 3.

FIG. 4 is a diagram illustrating a concrete example of the first communication parameters 111 according to the first embodiment. In the first communication parameters 111, an SSID (Service Set ID) serving as a network identifier is "ABC". WEP (Wired Equivalent Privacy) is used as an encryption scheme. As an encryption key, "zxfgmtqlc" is used. Its key length is 128 bits. As an authentication method, Open authentication is used.

According to the first embodiment, the access point 104, wireless terminal 101, and wireless terminal 107 keep time (in absolute time) using their own real-time clocks. According to the first embodiment, the absolute time at which communication parameters are started to be set are used as identification data to identify the setting target device. If values of the identification data match or are within a predetermined tolerance, it is considered that validation of the target device has been successful. That is, the wireless terminal 101 and access point 104 start setting the communication parameters simultaneously to make it possible to identify the setting target device of the communication parameters.

Next, a description will be given of a method for setting the communication parameters according to the first embodiment. According to the first embodiment, the access point 104 is communicating with the wireless terminal 107 using an encryption key (included in the first communication parameters 111) for communication. It periodically transmits a beacon containing SSID=ABC as the SSID of the wireless network 110. The beacon also contains, as a time stamp, the time at which it is transmitted.

A flow of this embodiment will be described below.

Figure 5:
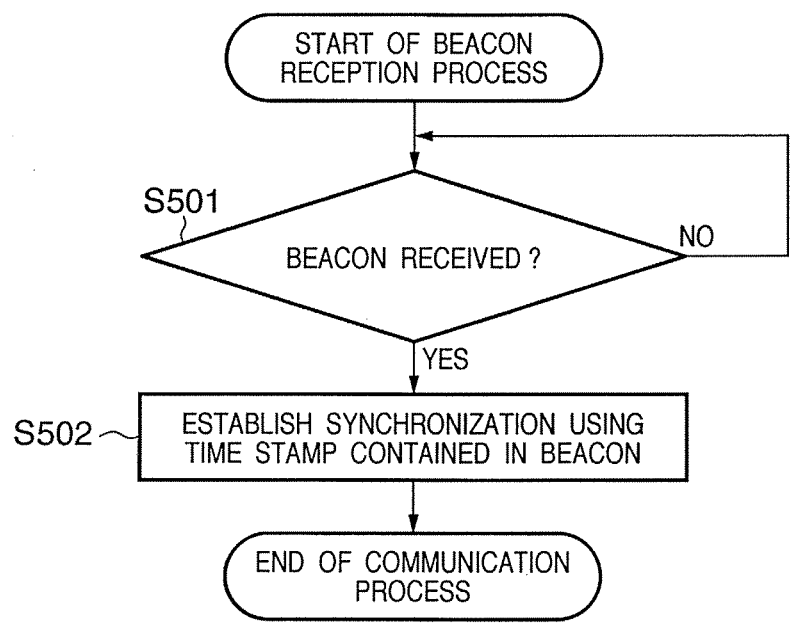
FIG. 5 is a flowchart explaining a beacon reception process on the wireless terminal according to the first embodiment.

FIG. 5 is a flowchart explaining a beacon reception process on the wireless terminal 101 according to the first embodiment. A program which performs this process is stored in the ROM 205 and is executed under the control of the controller 201.

The access point 104 transmits a beacon 1101 (FIG. 11) which contains, as a time stamp, the time given by the real-time clock 312. The wireless terminal 101 receives the beacon 1101 from the access point 104 in Step S501 and adjusts its real-time clock 212 in Step S502 based on the time stamp contained in the beacon 1101. This makes it possible to synchronize the real-time clock 312 of the access point 104 with the real-time clock 212 of the wireless terminal 101.

Figure 6:
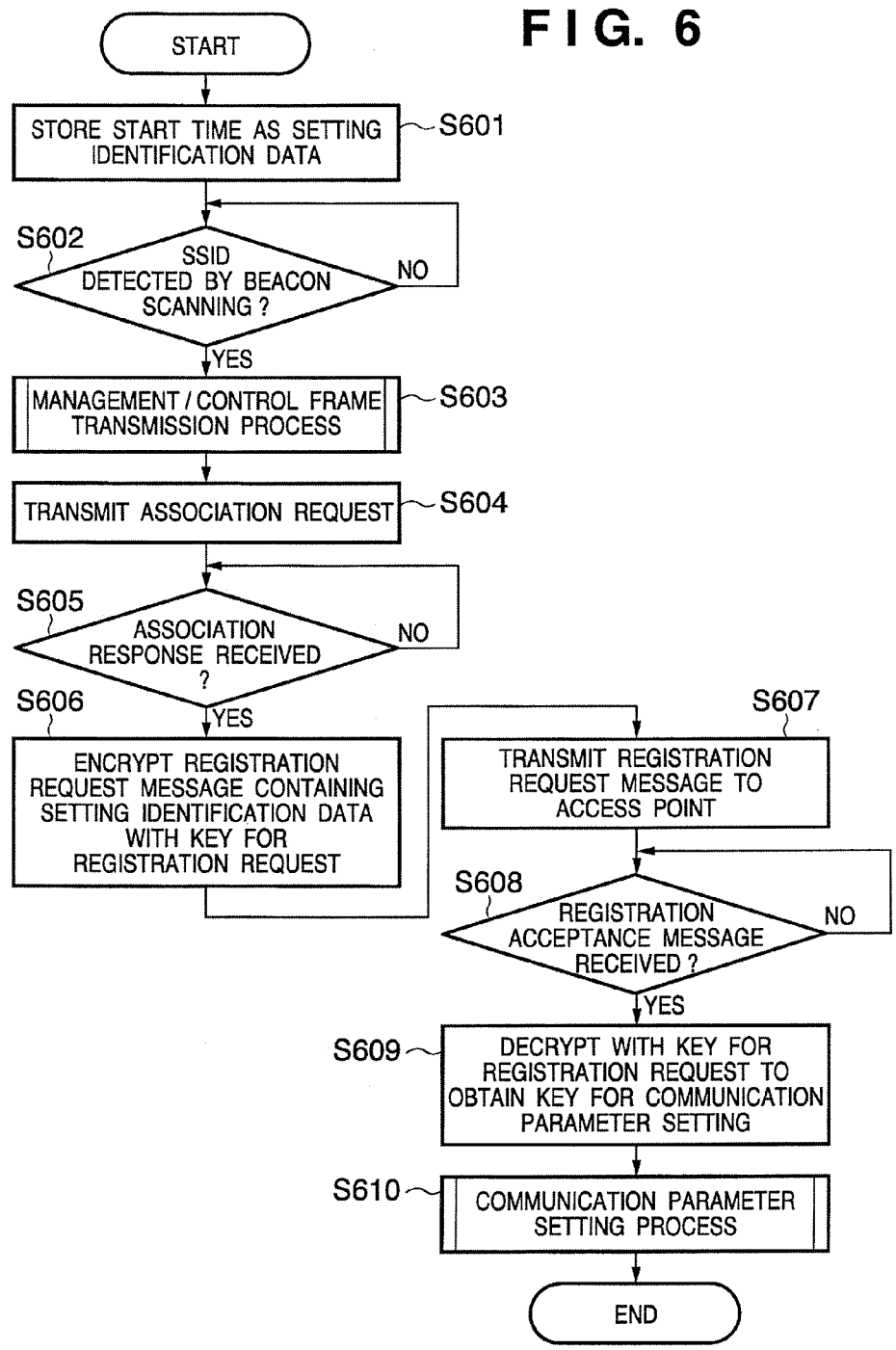
FIGS. 6 and 7 are flowcharts explaining a communication parameter setting process on the wireless terminal according to the first embodiment.
Figure 7:
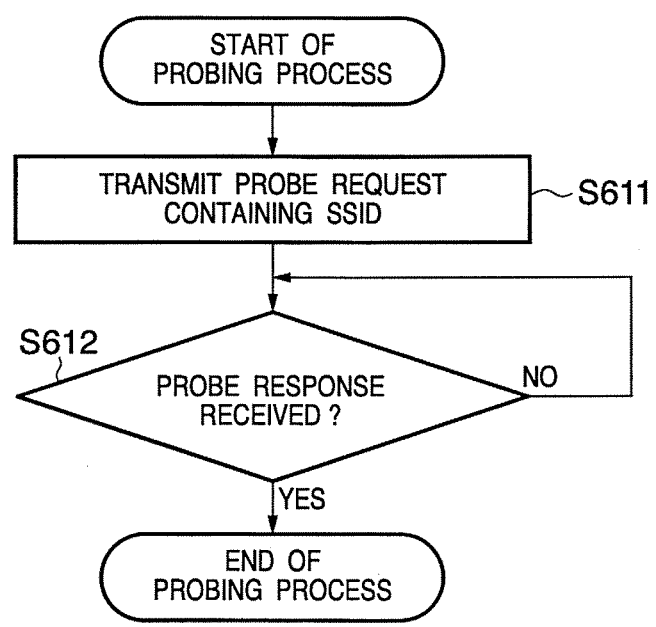

FIGS. 6 and 7 are flowcharts explaining a communication parameter setting process on the wireless terminal 101 according to the first embodiment. A program which performs this process is stored in the ROM 205 and is executed under the control of the controller 201.

Figure 8:
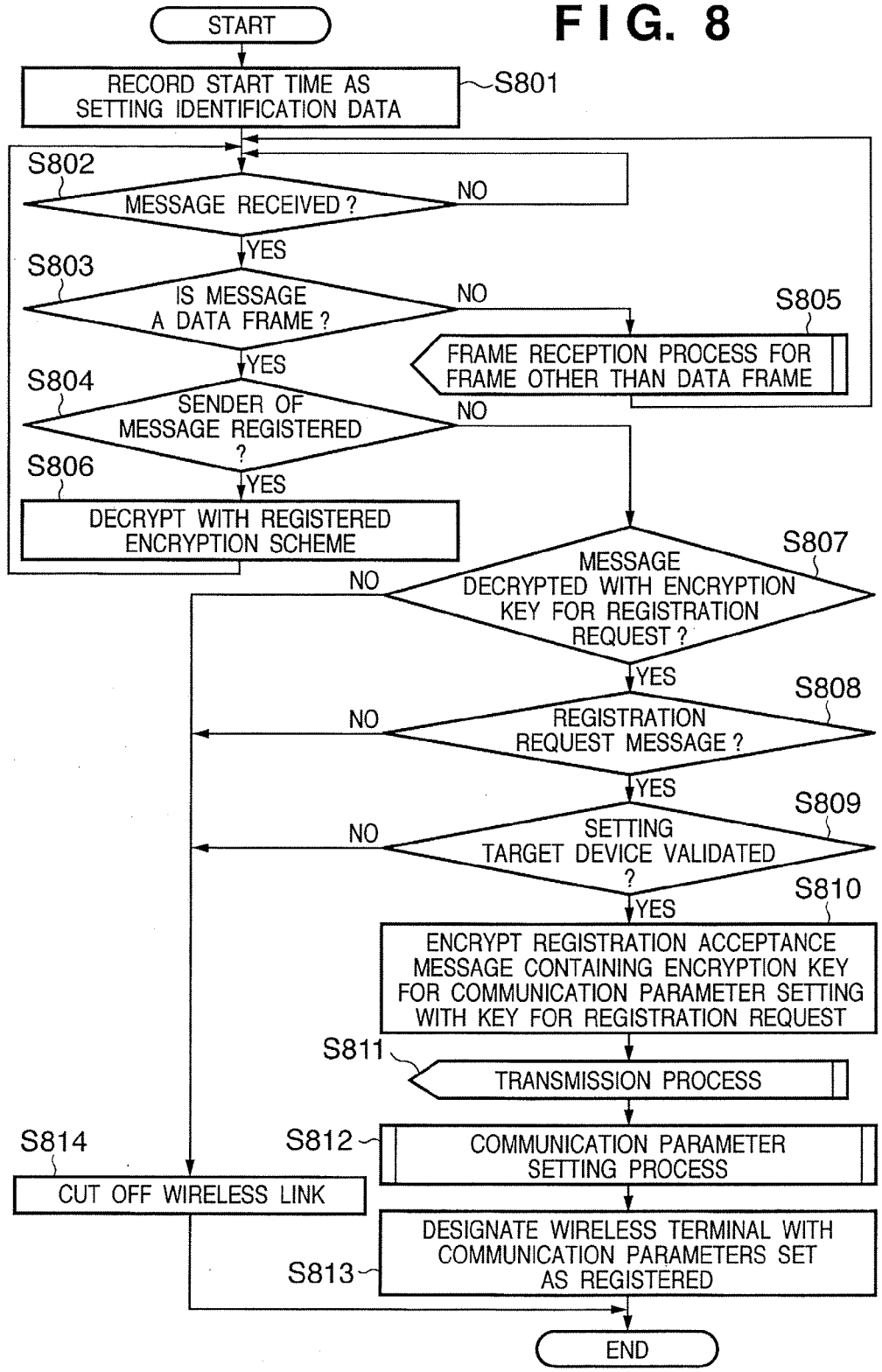
FIG. 8 is a flowchart explaining a communication parameter setting process on the access point according to the first embodiment.

FIG. 8 is a flowchart explaining a communication parameter setting process on the access point 104 according to the first embodiment. A program which performs this process is stored in the ROM 305 and is executed under the control of the controller 301.

Figure 9:
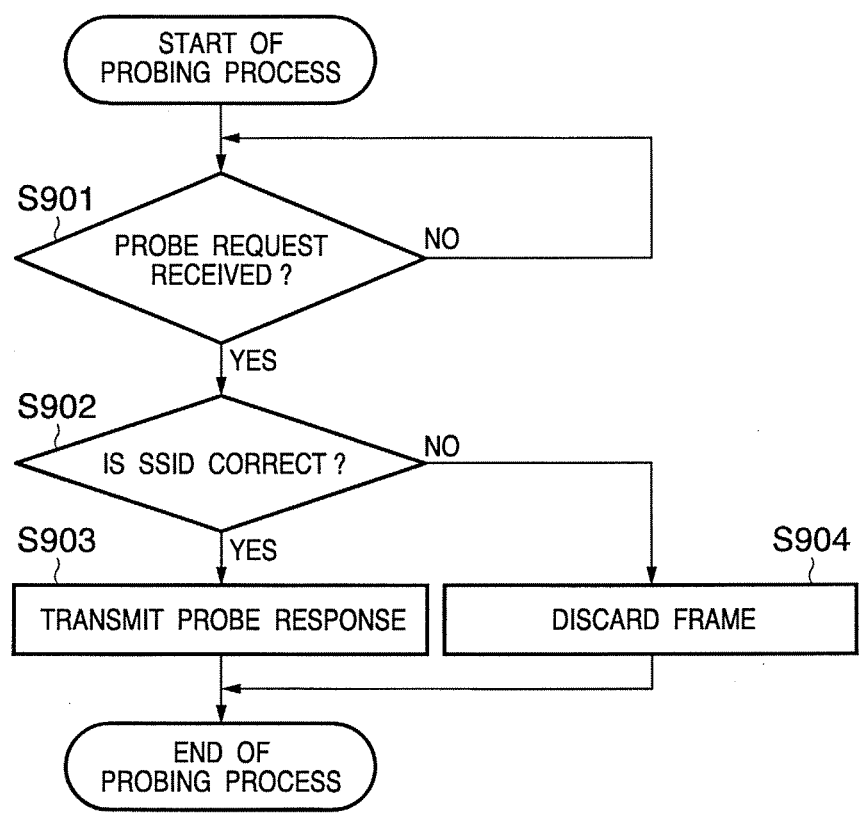
FIGS. 9 and 10 are flowcharts explaining part of a frame reception process in a determination process on the access point according to the first embodiment.
Figure 10:
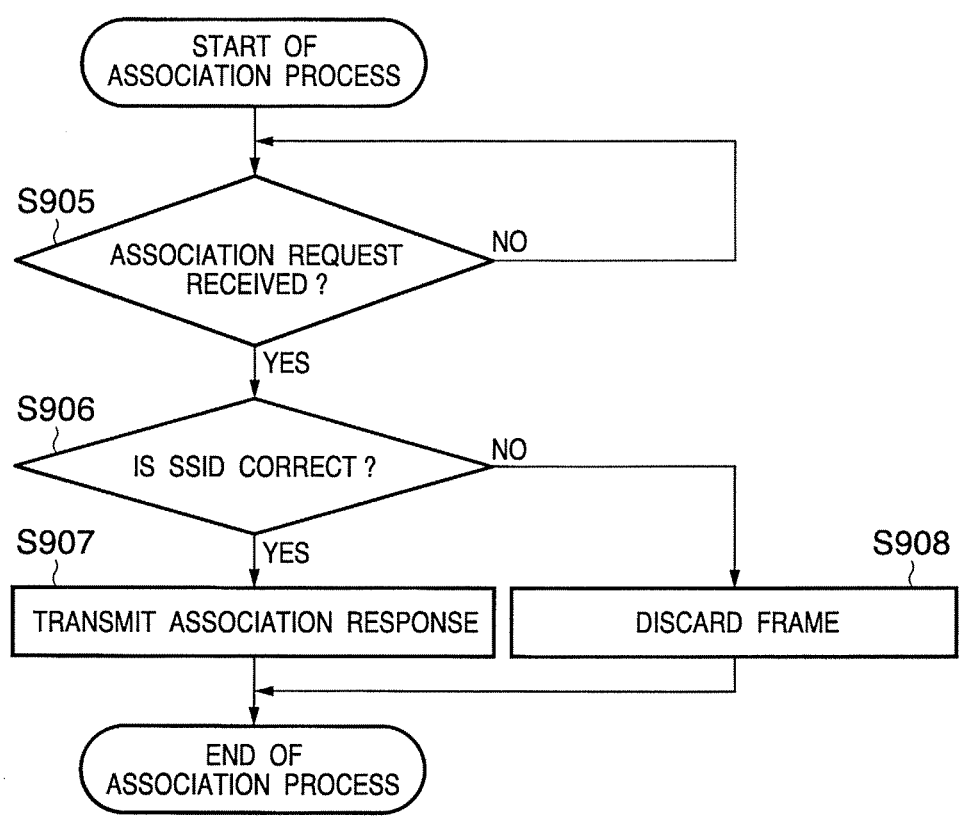

FIGS. 9 and 10 are flowcharts explaining part of a frame reception process in a determination process on the access point 104 shown in FIG. 8.

Figure 11:
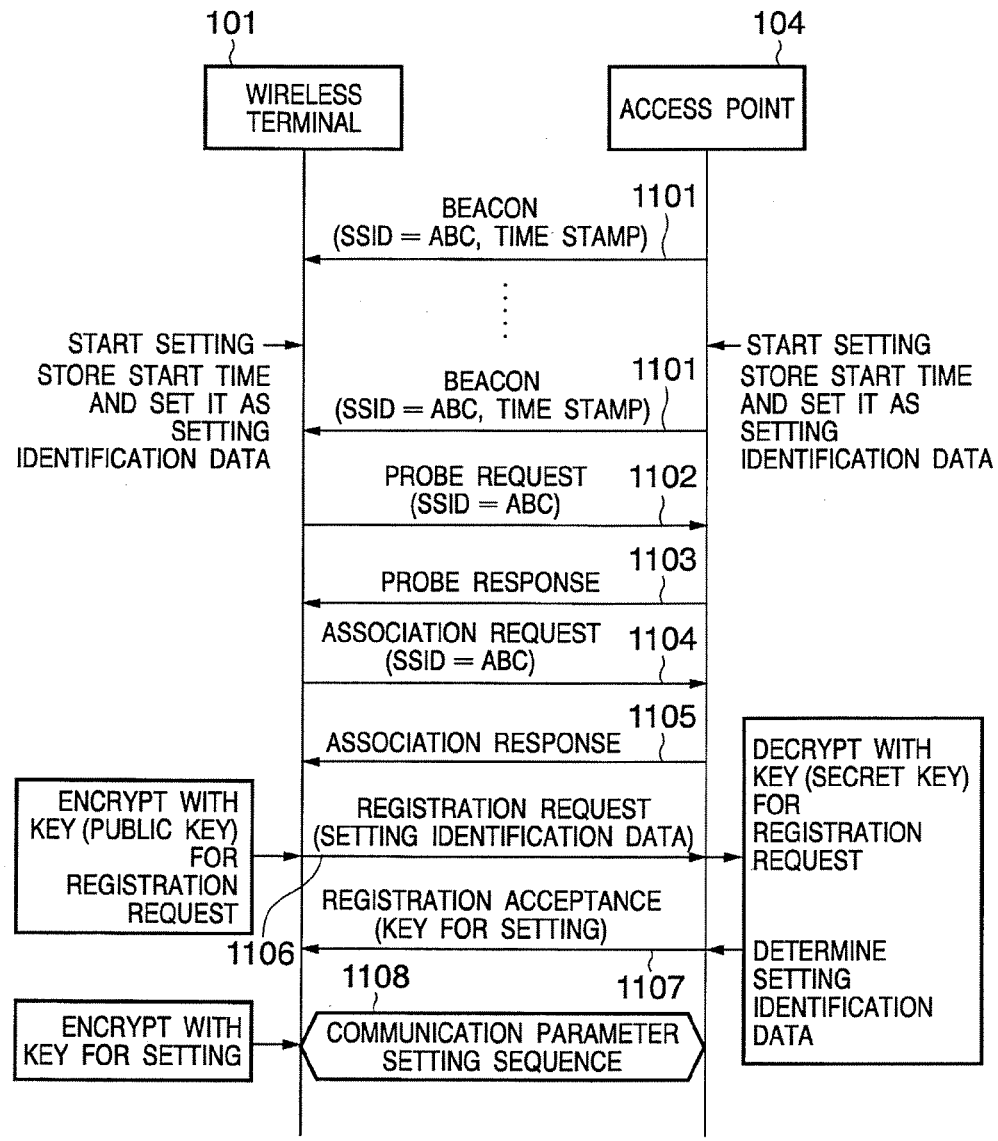
FIG. 11 is a diagram illustrating a communication parameter setting sequence performed between the wireless terminal and access point according to the first embodiment.

FIG. 11 is a diagram explaining a communication parameter setting sequence performed between the wireless terminal 101 and access point 104 according to the first embodiment.

The processes according to this embodiment will be described below with reference to these drawings.

To start setting communication parameters, a user of the wireless terminal 101 presses the button 103, thereby giving a command to start the communication parameter setting. Consequently, in Step S601, the wireless terminal 101 reads the time at which the button 103 is pressed from the real-time clock 212 and stores it in the RAM 204 as setting identification data of the wireless terminal 101. In Step S602, the wireless terminal 101 starts scanning a beacon. Incidentally, as shown in FIG. 11, the wireless terminal 101 has already received the beacon from the access point 104 when the button 103 is pressed. That is, the real-time clock 312 of the access point 104 and real-time clock 212 of the wireless terminal 101 are in synchronization.

The flowchart in FIG. 8 is started when the user of the access point 104 presses the button 106, thereby giving a command to start setting communication parameters. Consequently, in Step S801, the access point 104 reads the time at which the button 106 is pressed from the real-time clock 312 and stores it in the RAM 304 as setting identification data for the access point 104.

In Step S602 in FIG. 6, if the wireless terminal 101 receives a beacon 1101 (FIG. 11) from the access point 104, it detects "SSID=ABC" contained in the beacon. After the detection of the SSID, the wireless terminal 101 performs a management/control frame transmission process in Step S603. This process is compliant with IEEE 802.11. In this process, for example, a probe request is transmitted.

FIG. 7 is a flowchart explaining the probe request transmission process.

According to the first embodiment, a probe request 1102 is transmitted in Step S611. The probe request containing the detected "SSID=ABC" is transmitted to the access point 104.

Upon receiving the probe request 1102 (FIG. 11) from the wireless terminal 101, the access point 104 decides in Step S802 (FIG. 8) that a message has been received and determines in Step S803 whether the message is a data frame. Since the probe request 1102 is a control frame, the process of the access point 104 advances to Step S805 to perform a frame reception process for a frame other than a data frame.

The frame reception process is performed according to procedures for processing a management/control frame and is compliant with IEEE 802.11 (FIGS. 9 and 10). This process includes a probing process, which is performed based on the received probe request 1102.

FIG. 9 is a flowchart explaining the probing process.

After receiving the probe request in Step S901, the process of the access point 104 advances to Step S902. In Step S902, the access point 104 compares the SSID contained in the received probe request 1102 with the "SSID=ABC" of the first wireless network 110 constructed by the access point 104. If it is found as a result of the comparison that the SSID is correct (matches), the process advances to Step S903 to transmit a probe response 1103 to the wireless terminal 101. On the other hand, if it is found in Step S902 that the SSID is not correct (does not match), the process advances to Step S904, where the access point 104 discards the frame and finishes processing. After receiving the probe response 1103 in Step S612 in FIG. 7, the process of the wireless terminal 101 advances to Step S604 (FIG. 6) to establish a wireless link with the access point 104 and transmit an association request 1104 containing an SSID to the access point 104.

Upon receiving the association request 1104 from the wireless terminal 101, the access point 104 decides in Step S802 (FIG. 8) that a message has been received and determines in Step S803 whether the message is a data frame. Since the association request 1104 is a control frame, the process of the access point 104 advances to Step S805 to perform a frame reception process for a frame other than a data frame.

This process includes an association process, which is performed to process the received association request 1104.

FIG. 10 is a flowchart explaining the association process.

Upon receiving the association request 1104 in Step S905, the process of the access point 104 advances to Step S906. In Step S906, the access point 104 compares the SSID contained in the received association request 1104 with the "SSID=ABC" of the first wireless network 110 constructed by the access point 104. If it is found as a result of the comparison that the SSID is correct (matches), the process of the access point 104 advances to Step S907 to transmit an association request 1104 to the wireless terminal 101. On the other hand, if it is found in Step S906 that the SSID is not correct (does not match), the process advances to Step S908, where it discards the frame and finishes processing.

Consequently, the wireless terminal 101 receives an association response 1105 in Step S605 in FIG. 6. Thus, a wireless link has been established between the wireless terminal 101 and access point 104.

Upon receiving the association response 1105 (FIG. 11), the wireless terminal 101 transmits a registration request message 1106 containing its setting identification data (start time) to the access point 104. The registration request message 1106 is encrypted with an encryption key (public key) for a registration request in Step S606 (FIG. 6) and transmitted to the access point 104 in Step S607.

Consequently, the access point 104 receives the registration request message 1106 from the wireless terminal 101. As a result, the wireless terminal 101 decides in Step S802 (FIG. 8) that a message has been received. In Step S803, it determines whether the message is a data frame. Since the registration request message 1106 is a data frame, the process of the access point 104 advances to Step S804 to determine whether the sender of the message is a device registered with the first wireless network 110. The determination is made by the registration manager 314. Specifically, it is determined whether the device has been registered with the registration manager 314.

The wireless terminal 101 is not registered with the first wireless network 110 at the time when it transmits the registration request message 1106 (FIG. 11). Therefore, the access point 104 decides that the wireless terminal 101 is an unregistered device. Consequently, the process of the access point 104 advances from Step S804 to Step S807 and tries to decrypt the message received from the wireless terminal 101 judged to be an unregistered device with the encryption key (secret key) for a registration request. If the message cannot be decrypted with the encryption key for a registration request, the access point 104 decides that the message is invalid and the process advances to Step S814 to cut off the wireless link.

On the other hand, if the message is decrypted successfully in Step S807, the process of the access point 104 advances to Step S808 to determine whether the message is a registration request message 1106. If it is found as a result of the determination that the message is not a registration request message 1106, the process advances to Step S814, where it decides that the message is invalid and cuts off the wireless link. On the other hand, if it is found in Step S808 that the message is a registration request message 1106, the process of the access point 104 advances to Step S809 to compare the setting identification data of the wireless terminal 101 contained in the registration request with the setting identification data possessed by the access point 104. If it is found as a result of the comparison that values of the setting identification data match or are within a defined tolerance, it is considered that the device has been validated successfully. Consequently, the process of the access point 104 advances to Step S810 to encrypt a registration acceptance message 1107 (FIG. 11) containing an encryption key for communication parameter setting with an encryption key (secret key) for a registration request. The access point 104 transmits the encrypted registration acceptance message 1107 to the wireless terminal 101 in Step S811. On the other hand, if validation of the device fails in Step S809, the process advances to Step S814 and cuts off the wireless link.

According to the first embodiment, since the setting identification data is provided in the form of a setting start time, validation based on the setting identification data is considered to be successful if the difference between the setting start time of the access point 104 and setting start time of the wireless terminal 101 falls within a certain range such as five seconds (inclusive).

Upon receiving the registration acceptance message 1107 in Step S608 (FIG. 6), the process of the wireless terminal 101 advances to Step S609 to decrypt the registration acceptance message 1107 with the encryption key (public key) for a registration request. In Step S610, the wireless terminal 101 starts a communication parameter setting sequence 1108 (FIG. 11) together with the access point 104 using the encryption key for communication parameter setting contained in the registration acceptance message 1107. The communication parameter setting sequence 1108 is also performed between the wireless terminal 101 and access point 104 in Step S812 in FIG. 8. In the communication parameter setting sequence 1108, the access point 104 encrypts the first communication parameters 111 with the encryption key for communication parameter setting and transmits it to the wireless terminal 101. The wireless terminal 101 receives the first communication parameters 111 and decrypts the parameters with the encryption key for communication parameter setting to set in the wireless terminal 101. When the communication parameter setting sequence 1108 is completed, in Step S813 in FIG. 8, the access point 104 registers the wireless terminal 101 with the registration manager 314 as a device already registered with the first wireless network 110. The wireless terminal 101 on which the communication parameters have been set can now conduct data communication with devices in the first wireless network 110.

If the access point 104 receives a message (data frame) from the wireless terminal 107, it determines in Step S804 whether the wireless terminal 107 has been registered with the first wireless network 110. Since the wireless terminal 107 has been registered with the registration manager 314 in this case, the access point 104 decrypts the message using the encryption key and encryption scheme (included in the first communication parameters 111) for the wireless terminal 107 (Step S806). Regarding messages transmitted from the access point 104 to the wireless terminal 107, they are also encrypted using the encryption key and encryption scheme (included in the first communication parameters 111) for the wireless terminal 107 before transmission. Also, the wireless terminal 101, once registered, can conduct encrypted communication using the first communication parameters 111 as in the case of the wireless terminal 107.

In this way, according to the first embodiment, it is possible to set communication parameters on a target device without interrupting communication even if the target device is communicating with another device. It also makes it possible to identify a setting target device by starting to set the communication parameters simultaneously or almost simultaneously on the two devices between which the communication parameters are to be set.

<Second Embodiment>

A second embodiment of the present invention will be described next. According to the second embodiment, the wireless terminal on which communication parameters are to be set is located in service areas of multiple access points. The embodiment uses the start time of communication parameter setting as the setting identification data for use to identify the setting target device as in the case of the first embodiment.

Figure 12:
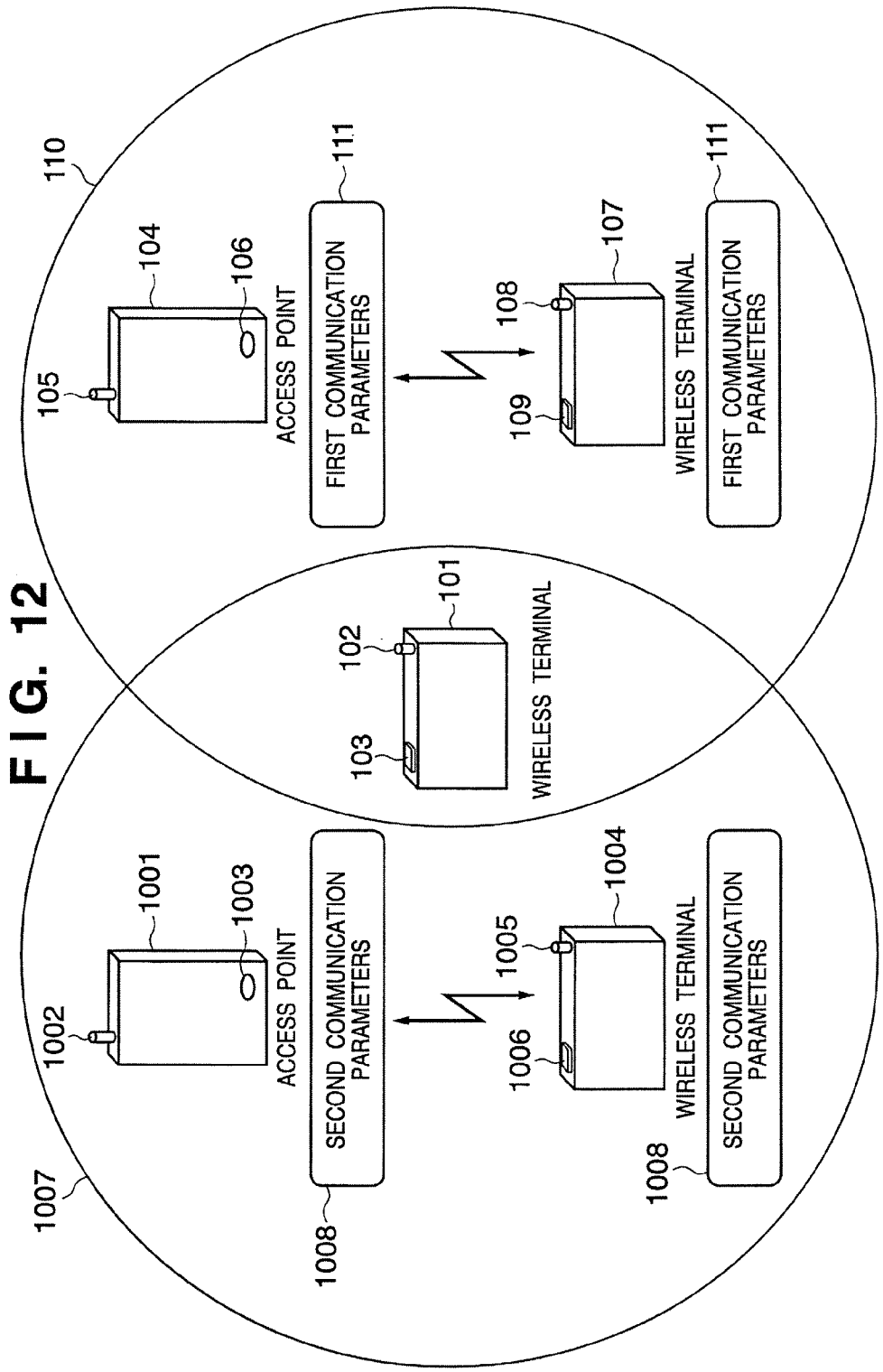
FIG. 12 is a block diagram illustrating a wireless communication system according to a second embodiment.

FIG. 12 is a block diagram illustrating a wireless communication system according to the second embodiment. The system includes an access point 104, access point 1001, wireless terminal 101, wireless terminal 107, and wireless terminal 1004 which conduct wireless LAN communication compliant with IEEE 802.11. The same components as those of the first embodiment are denoted by the same reference numerals as the corresponding components of the first embodiment.

The access point 1001 is equipped with a wireless communication unit 1002 to construct a wireless LAN. When a button 1003 is pressed, the access point 1001 starts automatic setting of communication parameters. The wireless terminal 1004 is equipped with a wireless communication unit 1005. When a button 1006 is pressed, the wireless terminal 1004 starts an auto-setting process of communication parameters.

Here, the access point 104 forms a first wireless network 110 using first communication parameters 111. Also, the wireless terminal 107 is communicating with the access point 104 by setting the first communication parameters 111. That is, the wireless terminal 107 has been registered with a registration manager 314 of the access point 104, and the access point 104 decides that the wireless terminal 107 has been registered with the wireless network 110.

On the other hand, the access point 1001 forms a second wireless network 1007 using second communication parameters 1008. The wireless terminal 1004 is communicating with the access point 1001 by setting the second communication parameters 1008. That is, the wireless terminal 1004 has been registered with a registration manager 314 of the access point 1001, and the access point 1001 decides that the wireless terminal 1004 has been registered with the wireless network 1007.

The wireless terminal 101 is located where the service areas of the first wireless network 110 and second wireless network 1007 overlap and is a newly joining terminal of the first wireless network 110 and second wireless network 1007. That is, the wireless terminal 101 is not registered with the registration managers 314 of the access point 104 and access point 1001.

The access points 104 and 1001 have a secret key as an encryption key for a registration request. The wireless terminals 101, 107, and 1004 have a public key as an encryption key for a registration request. It is assumed here that the wireless terminal 101 sets communication parameters in relation to the access point 104. Incidentally, the wireless terminals and access points according to the second embodiment have the same configurations as those shown in the block diagrams in FIGS. 2 and 3. The access point 104, access point 1001, wireless terminal 101, wireless terminal 107, and wireless terminal 1004 keep time (in absolute time) using their own real-time clocks. The wireless terminals 101, 107, and 1004 have respective synchronized timetables.

FIGS. 13A and 13B are diagrams illustrating parameter tables of the first communication parameters 111 and second communication parameters 1008, respectively.

FIG. 14 shows an example of the present time indicated by the respective real-time clocks of the wireless terminal 101, access point 104, and access point 1001. In this way, there are slight differences in the present time indicated in the wireless terminal 101, access point 104, and access point 1001.

FIG. 15 is a diagram illustrating an example of a synchronized timetable possessed by the wireless terminal 101 according to the second embodiment. The synchronized timetable is stored in the RAM 204.

The synchronized timetable contains information about constituent devices of the wireless network, an SSID of the wireless network, and time differences between the constituent devices of the wireless network and owner of the synchronized timetable. The time differences are calculated and updated each time a beacon is received from an appropriate access point. In the example of FIG. 15, the time kept by the access point 104 differs from the time kept by the wireless terminal 101 by +13 seconds while the time kept by the access point 1001 differs from the time kept by the wireless terminal 101 by −20 seconds.

Next, a method for setting the communication parameters according to the second embodiment will be described with reference to flowcharts in FIGS. 16 to 19.

Figure 16:
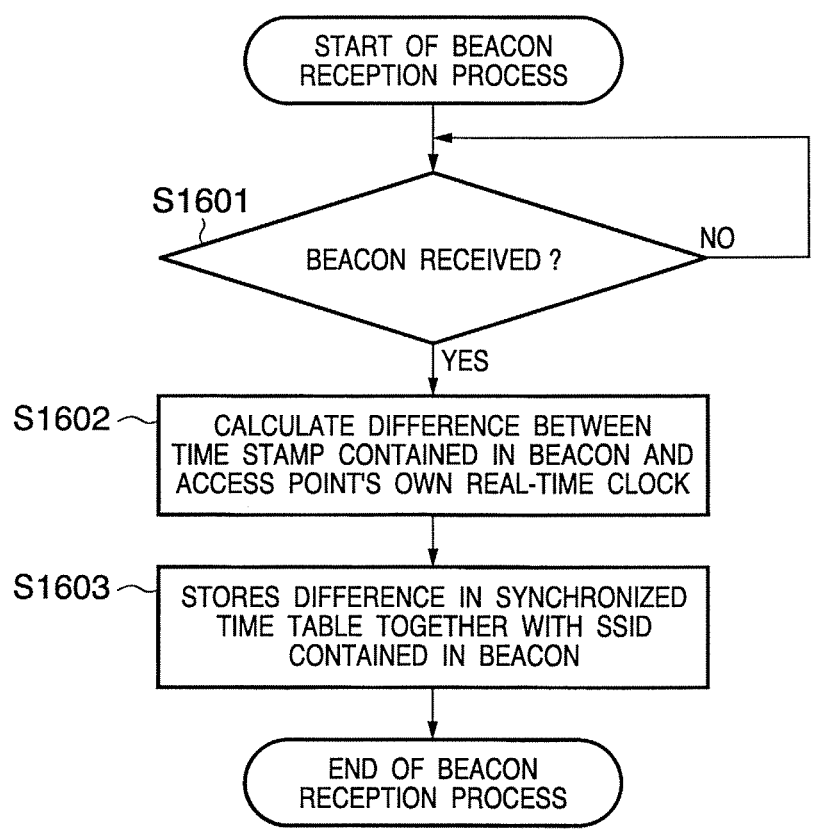
FIG. 16 is a flowchart explaining a beacon reception process on the wireless terminal according to the second embodiment.

FIG. 16 is a flowchart explaining a beacon reception process on the wireless terminal 101 according to the second embodiment.

Figure 17:
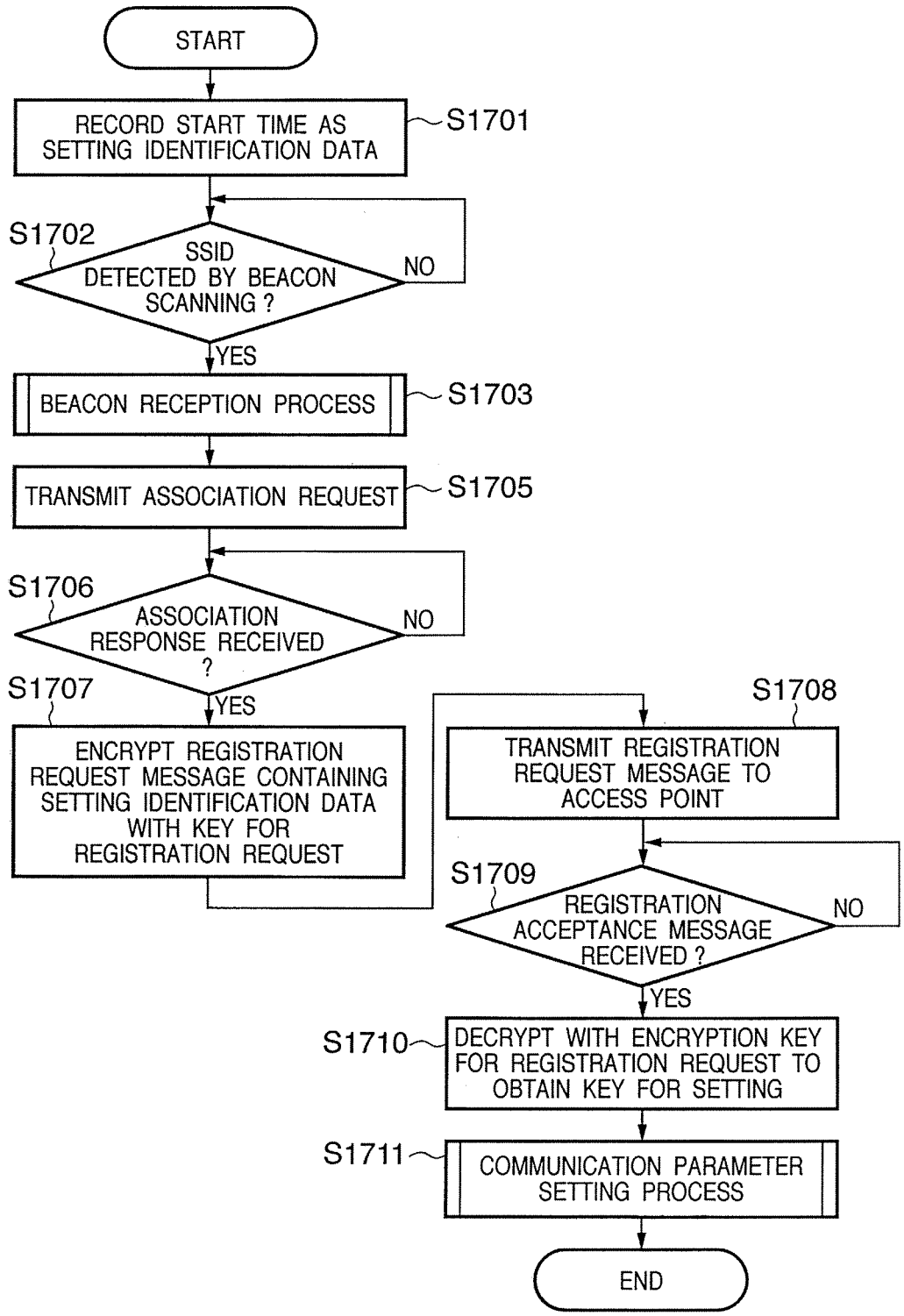
FIG. 17 is a flowchart explaining a communication parameter setting process on the wireless terminal according to the second embodiment.

FIG. 17 is a flowchart explaining a communication parameter setting process on the wireless terminal 101 according to the second embodiment.

Incidentally, the communication parameter setting process on the access point 104 is the same as the process illustrated in the flowchart in FIG. 8, and thus description thereof will be omitted.

Figure 18:
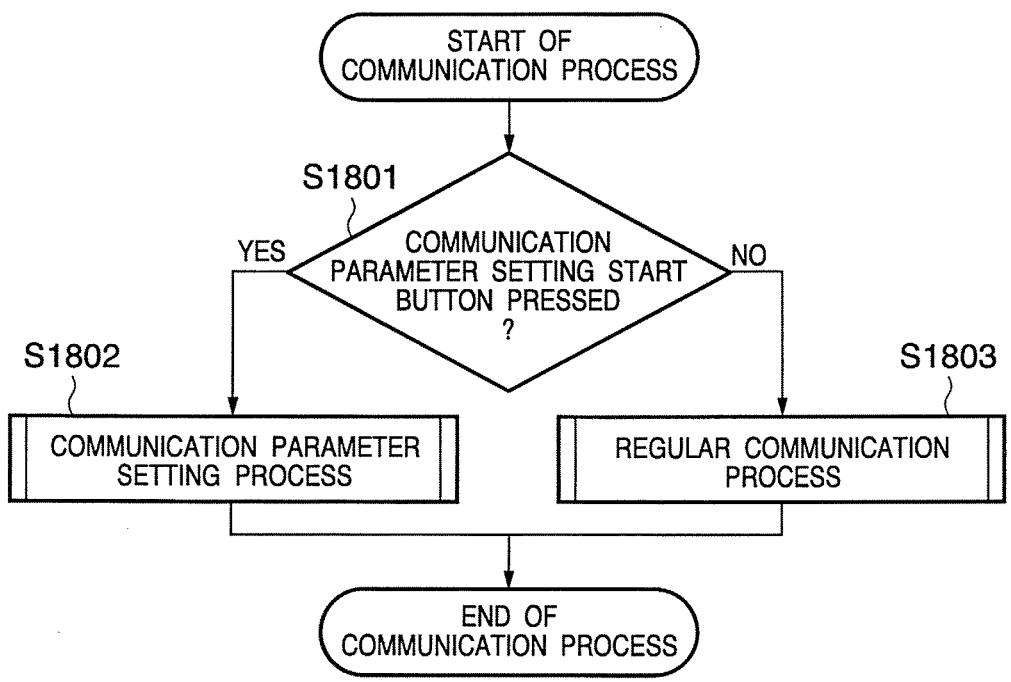
FIG. 18 is a flowchart explaining a communication process on an access point according to the second embodiment.

FIG. 18 is a flowchart explaining a communication process on the access point 1001 according to the second embodiment.

Figure 19:
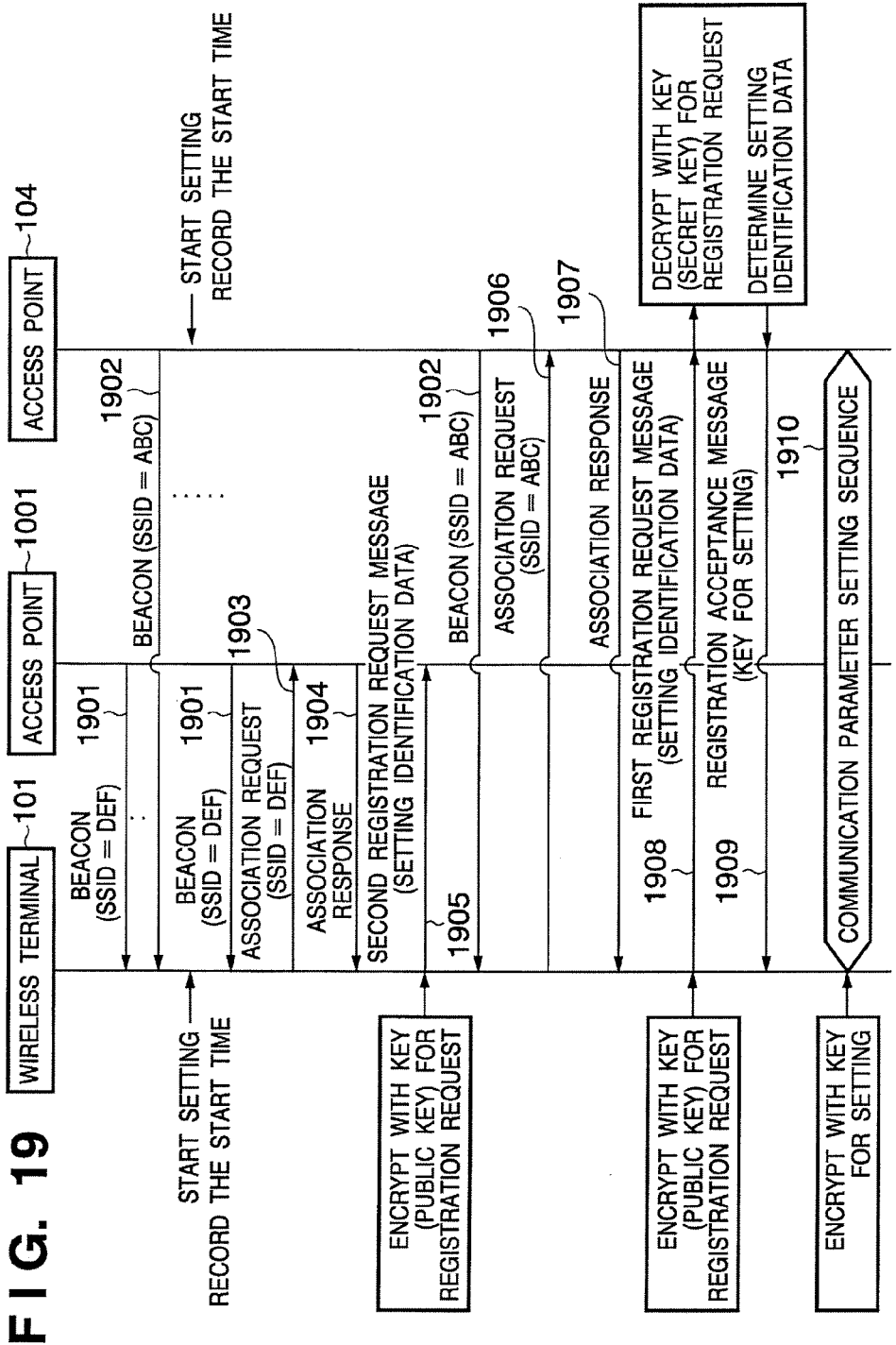
FIG. 19 is a diagram explaining a communication parameter setting sequence performed among the wireless terminal, access point 104, and access point 1001 according to the second embodiment.

FIG. 19 is a diagram explaining a communication parameter setting sequence performed among the wireless terminal 101, access point 104, and access point 1001 according to the second embodiment.

According to the second embodiment, as in the case of the first embodiment, the wireless terminal 101 and access point 104 start setting the communication parameters simultaneously to identify the target device on which the communication parameters will be set.

The access point 104 is communicating with the wireless terminal 107 using an encryption key (included in the first communication parameters 111) for communication. It periodically transmits a beacon 1902 (FIG. 19) containing "SSID=ABC" as the SSID of the first wireless network 110. The beacon 1902 also contains, as a time stamp, the time at which it is transmitted. Similarly, the access point 1001 is communicating with the wireless terminal 1004 using an encryption key (included in the second communication parameters 1008) for communication. It periodically transmits a beacon 1901 (FIG. 19) containing "SSID=DEF" as the SSID of the second wireless network 1007. The beacon 1901 also contains, as a time stamp, the time at which it is transmitted.

The processes according to the second embodiment will be described in detail below.

Referring to FIG. 16, if the wireless terminal 101 receives a beacon 1902 from the access point 104 in Step S1601, the process advances to Step S1602. In Step S1602, the wireless terminal 101 compares the value of its own real-time clock 212 with the time stamp contained in the beacon 1902 and calculates the difference. In Step S1603, the wireless terminal 101 stores the difference in the synchronized timetable together with "SSID=ABC" contained in the beacon 1902.

On the other hand, if the wireless terminal 101 receives a beacon 1901 from the access point 1001 in Step S1601, the process advances to Step S1602. In Step S1602, the wireless terminal 101 compares the value of its own real-time clock 212 with the time stamp contained in the beacon 1901 and calculates the difference. In Step S1603, the wireless terminal 101 stores the difference in the synchronized timetable together with "SSID=DEF" contained in the beacon 1901. This ends the beacon reception process on the wireless terminal 101. Incidentally, the above information is stored by being associated with addresses (MAC addresses or the like) of the access points 104 and 1001 which have received the beacons 1901 and 1902 and is managed on a per-access-point basis.

Next, to start setting communication parameters, the user of the wireless terminal 101 presses a communication parameter setting start button 103. Consequently, the flowchart shown in FIG. 17 is started. In Step S1701, the wireless terminal 101 reads the time at which the communication parameter setting start button 103 is pressed from the real-time clock 212 and stores this process start time. In Step S1702, the wireless terminal 101 starts scanning the beacon.

On the other hand, the user of the access point 104 presses a communication parameter setting start button 106 to start setting communication parameters. Consequently, the process represented by the flowchart in FIG. 8 is started. In Step S801, the access point 104 reads the time at which the communication parameter setting start button 106 is pressed from the real-time clock 312 and stores it in the RAM 304 as setting identification data for the access point 104.

In Step S1702, if the wireless terminal 101 receives a beacon 1902 from the access point 104, it detects the SSID contained in the beacon 1902. After that, the process of the wireless terminal 101 advances to Step S1703 to perform the beacon reception process illustrated in FIG. 16. After the beacon reception process, the wireless terminal 101 transmits an association request 1906 (FIG. 19) containing the detected SSID to the access point 104 in Step S1705. Incidentally, although a management/control frame transmission process which involves transmitting a probe request is not described here, it may be performed as in the case of the first embodiment.

Upon receiving the association request 1906 from the wireless terminal 101 in Step S905 in FIG. 10, the access point 104 transmits an association response 1907 (FIG. 19) to the wireless terminal 101 (Step S907) as in the case of the first embodiment.

The wireless terminal 101 receives the association response 1907 in Step S1706 and the process advances to Step S1707. In Step S1707, the wireless terminal 101 adds the difference contained in the synchronized timetable corresponding to "SSID=ABC" of the first wireless network 110, i.e., the sender (the access point 104) of the association response, to the stored start time, and thereby generates setting identification data. Subsequently, the wireless terminal 101 encrypts a first registration request message 1908 (FIG. 19) containing the generated setting identification data with an encryption key (public key) for a registration request. After that, the process of the wireless terminal 101 advances to Step S1708 to transmit the first registration request message 1908 to the access point 104.

Consequently, the access point 104 can decrypt the message from the unregistered wireless terminal 101. It determines in Step S808 in FIG. 8 whether the received message is a registration request message. Since it is a registration request message 1908, the access point 104 determines in Step S809 whether the wireless terminal 101 is a setting target device based on the received setting identification data. For that, the setting identification data of the wireless terminal 101 contained in the registration request is compared with the setting identification data possessed by the access point 104. If it is found as a result of the comparison that values of the setting identification data match or are within a defined tolerance, it is considered that the wireless terminal 101 has been validated successfully, and the process of the access point 104 advances to Step S810. In Step S810, the access point 104 encrypts a registration acceptance message 1909 (FIG. 19) containing an encryption key for communication parameter setting with an encryption key (secret key) for a registration request. The access point 104 transmits the encrypted registration acceptance message 1909 to the wireless terminal 101 in Step S811. Upon receiving the registration acceptance message in Step S1709, the wireless terminal 101 decrypts the registration acceptance message with the encryption key (public key) for a registration request in Step S1710 to obtain an encryption key for communication parameter setting. Subsequently, in Step S812 and Step S1711, the access point 104 performs a communication parameter setting sequence 1910 together with the wireless terminal 101. As a result of the communication parameter setting sequence 1910, the first communication parameters 111 are encrypted with the encryption key for communication parameter setting and transmitted to the wireless terminal 101 by the access point 104. The wireless terminal 101 receives the first communication parameters 111 and decrypts the parameters with the encryption key for communication parameter setting to set the parameters. Consequently, the wireless terminal 101 can now conduct communication with devices in the first wireless network 110.

Similarly, in communication between the access point 1001 and wireless terminal 101, upon receiving a beacon 1901 from the access point 1001, the wireless terminal 101 performs the beacon reception process illustrated in FIG. 16 in Step S1703. After the beacon reception process, the wireless terminal 101 transmits an association request 1903 to the access point 1001 in Step S1705.

The process performed by the access point 1001 will be described with reference to FIG. 18. Upon receiving the association request 1903 (FIG. 19), the access point 1001 determines in Step S1801 whether the communication parameter setting start button 1003 has been pressed. In this case, the communication parameter setting start button 1003 has not been pressed in the access point 1001. Consequently, a communication parameter setting process is not performed and the received message is processed in a regular communication process (Step S1803). Thus, upon receiving the association request 1903 from the wireless terminal 101 in Step S1803, the access point 1001 performs a regular communication process to transmit an association response 1904 to the wireless terminal 101.

The wireless terminal 101 receives the association response 1904 (S1706) and the process advances to Step S1707. In Step S1707, the wireless terminal 101 adds the difference contained in the synchronized timetable corresponding to "SSID=DEF" of the second wireless network 1007, i.e., the sender (the access point 1001) of the association response, to the stored start time, and thereby generates setting identification data. Subsequently, the wireless terminal 101 encrypts a second registration request message 1905 (FIG. 19) containing the generated setting identification data with an encryption key (public key) for a registration request and transmits it to the access point 1001 (Step S1708).

Upon receiving the second registration request message 1905 from the wireless terminal 101, the access point 1001 decides that a message has been received, and performs a regular communication process. However, the message (second registration request message 1905), which has been encrypted with the encryption key for a registration request, cannot be decrypted in a regular communication process. Consequently, the access point 1001 decides that the message is invalid and discards the received message or cuts off the wireless link with the wireless terminal 101 (Step S1803).

During this time, if the access point 104 receives the message (date frame) from the wireless terminal 107, it determines in Step S804 whether the wireless terminal 107 has been registered with the first wireless network 110. It has been in this case, and thus the process of the access point 104 advances to Step S806 to decrypt the massage using the encryption key and encryption scheme (included in the first communication parameters 111) for the wireless terminal 107.

Regarding messages transmitted from the access point 104 to the wireless terminal 107, they are also encrypted using the encryption key and encryption scheme (included in the first communication parameters 111) for the wireless terminal 107 before transmission.

Also, communication between the access point 1001 and wireless terminal 1004 is maintained by the regular communication process (Step S1803) represented by the flow in FIG. 18.

According to the second embodiment, if a plurality of different SSID beacons are received during the period from the press of the button 103 to the end of the communication parameter setting, the wireless terminal 101 transmits a registration request message to all the access points which have transmitted the beacons containing the detected SSIDs. However, once communication parameters are set in relation to any of the access points through a communication parameter setting sequence, the registration request message may not be transmitted to the other access points.

According to the second embodiment, since synchronization is achieved with each access point, even if there are a plurality of access points, it is possible to almost eliminate differences in start times serving as setting identification data.

<Third Embodiment>

According to a third embodiment, the time between the start of communication parameter setting and transmission or reception of a registration request message according to the first embodiment is measured using the timers 213 and 313 of the wireless terminal and access point. The time measured by each timer is used as setting identification data. If the values of the setting identification data match or their difference is not larger than a predetermined tolerance, it is considered that the wireless terminal has been validated as a setting target device. Again, the wireless terminal 101 and access point 104 start setting the communication parameters simultaneously to identify the target device.

Next, a method for setting the communication parameters according to the third embodiment will be described with reference to FIGS. 20 to 22.

Figure 20:
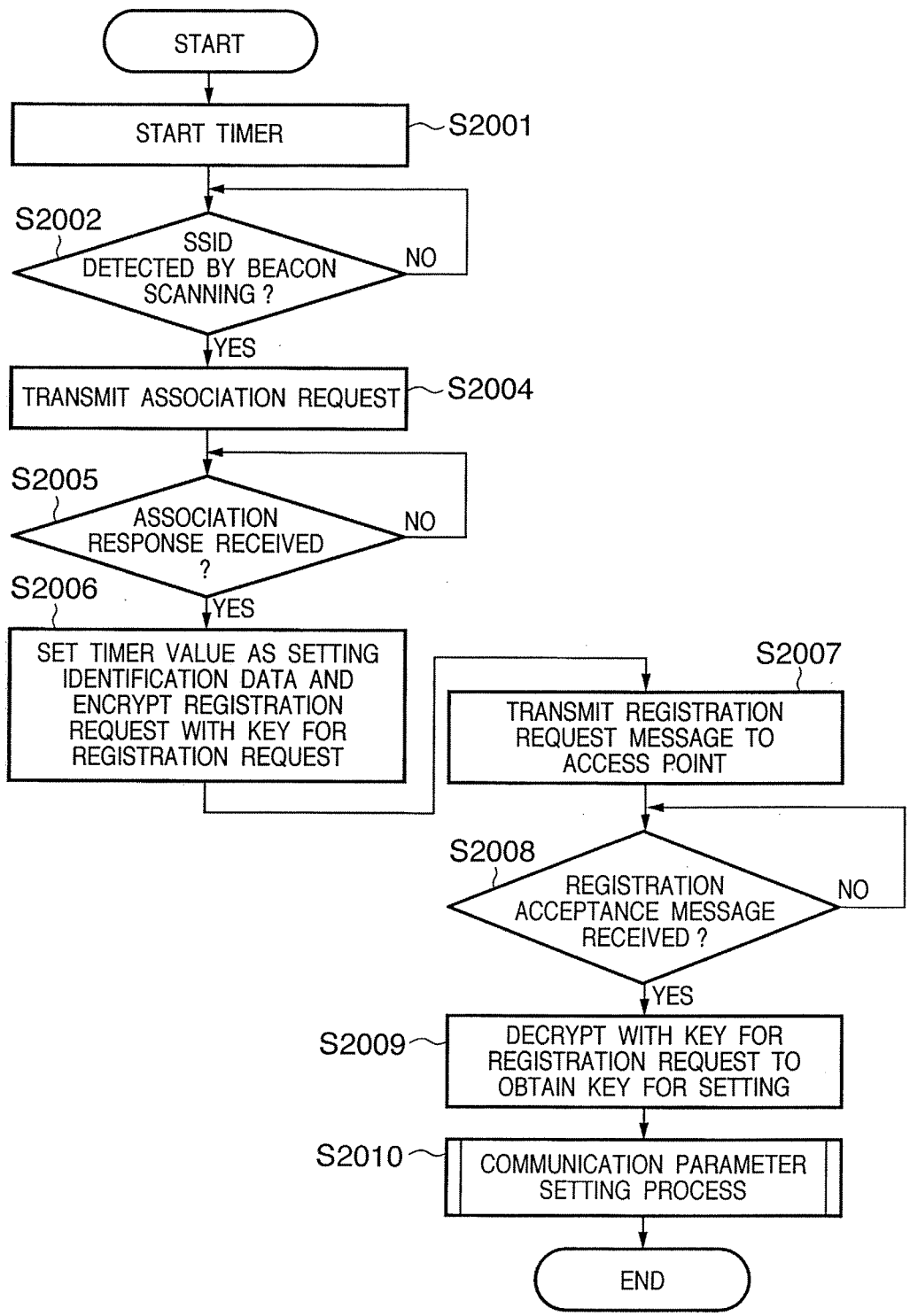
FIG. 20 is a flowchart explaining a communication parameter setting process on a wireless terminal according to a third embodiment.

FIG. 20 is a flowchart explaining a communication parameter setting process on a wireless terminal 101 according to the third embodiment.

Figure 21:
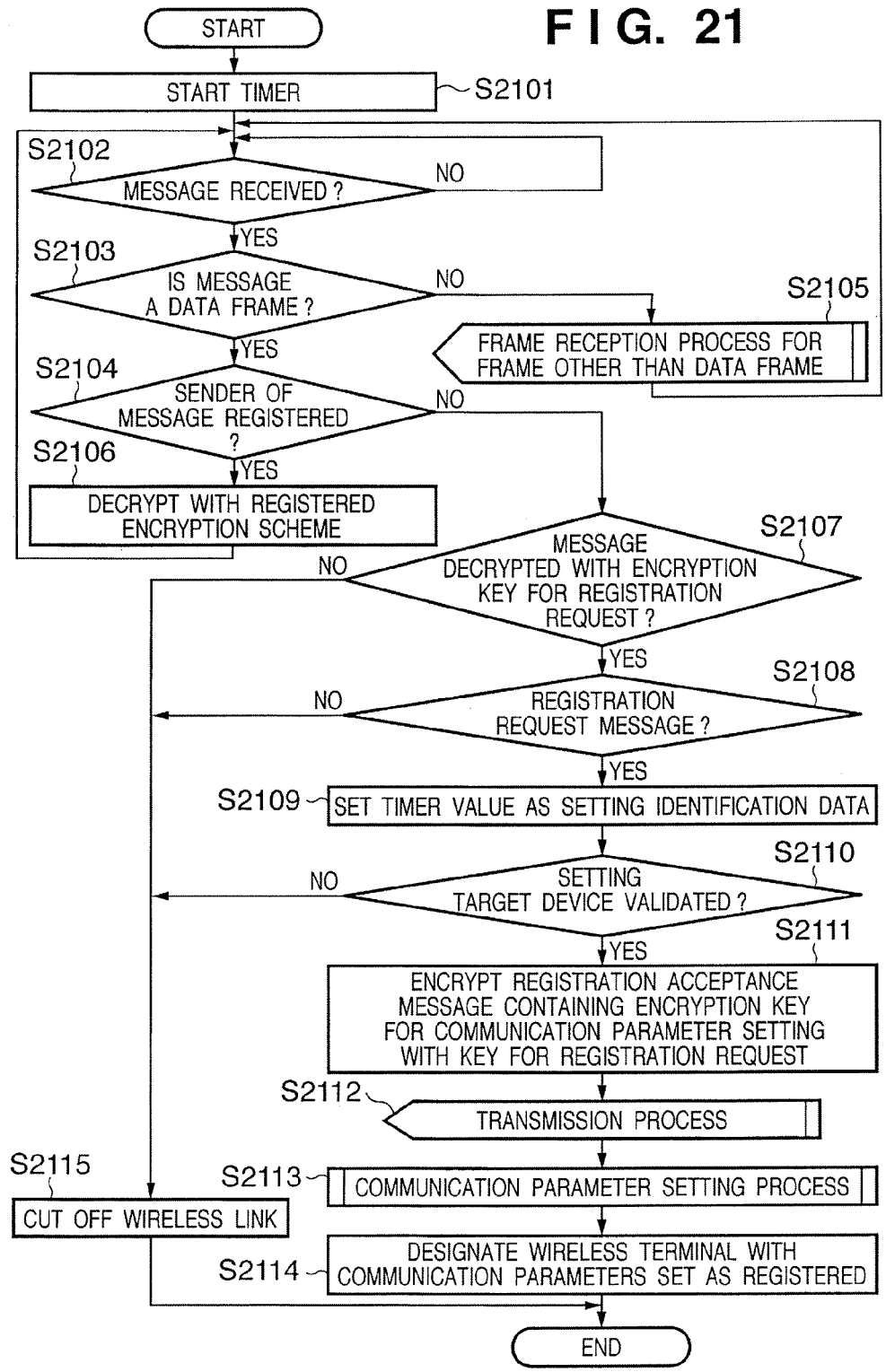
FIG. 21 is a flowchart explaining a communication parameter setting process on an access point according to the third embodiment.

FIG. 21 is a flowchart explaining a communication parameter setting process on an access point 104 according to the third embodiment. Incidentally, a frame reception process for a frame other than a data frame such as shown in FIG. 21 includes the process shown in FIGS. 9 and 10 as a part of it.

Figure 22:
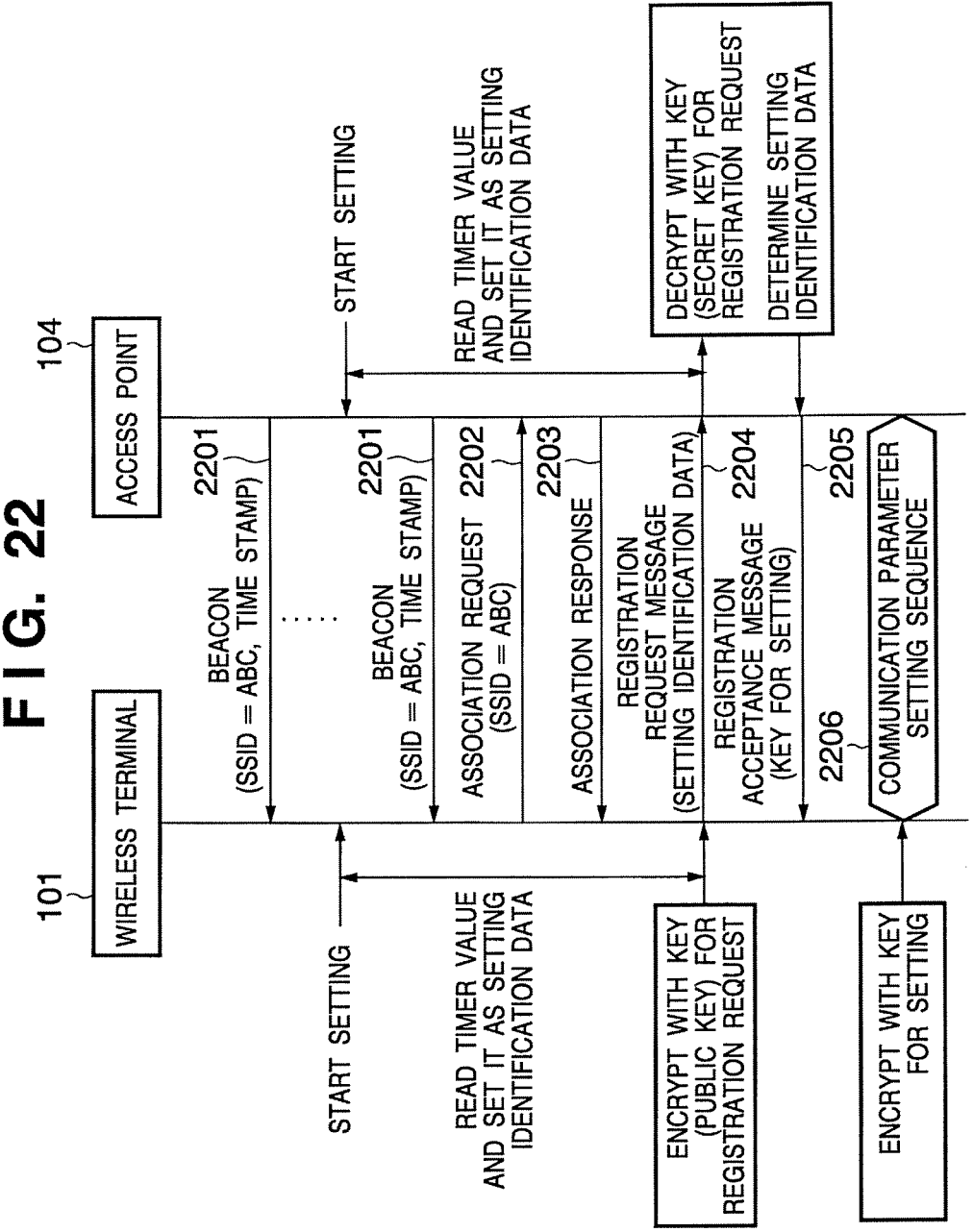
FIG. 22 is a diagram explaining a communication parameter setting sequence performed between the wireless terminal and access point according to the third embodiment.

FIG. 22 is a diagram explaining a communication parameter setting sequence performed between the wireless terminal 101 and access point 104 according to the third embodiment.

According to the third embodiment, as in the case of the first embodiment, the access point 104 is communicating with the wireless terminal 107 using the first communication parameters 111. It periodically transmits a beacon containing "SSID=ABC" as the SSID of the first wireless network 110.

The processes according to the third embodiment will be described below.

To start setting communication parameters, the user of the wireless terminal 101 presses the communication parameter setting start button 103. Consequently, the process represented by the flowchart in FIG. 20 is started. In Step S2001, when the communication parameter setting start button 103 is pressed, the wireless terminal 101 starts the timer 213 to start counting time. In Step S2002, the wireless terminal 101 starts scanning the beacon.

On the other hand, the user of the access point 104 presses the communication parameter setting start button 106 to start setting communication parameters. Consequently, the flowchart shown in FIG. 21 is started. In Step S2101, when the communication parameter setting start button 106 is pressed, the access point 104 starts the timer 313 to start counting time.

In Step S2002, if the wireless terminal 101 receives a beacon 2201 (FIG. 22) from the access point 104, it detects "SSID=ABC" contained in the beacon 2201. After detecting the SSID, the wireless terminal 101 transmits an association request 2202 containing "SSID=ABC" to the access point 104 in Step S2004. Incidentally, although a management/control frame transmission process which involves transmitting a probe request is not described here, it may be performed as in the case of the first embodiment.

Upon receiving the association request 2202 from the wireless terminal 101 in Step S905 (FIG. 10), the access point 104 transmits an association response 2203 (FIG. 22) to the wireless terminal 101 (Step S907) as in the case of the first embodiment.

Consequently, the wireless terminal 101 receives the association response 2203 in Step S2005. Next, in Step S2006, the wireless terminal 101 reads the timer value from the activated timer 213 and uses the timer value as the setting identification data of the wireless terminal 101. Subsequently, the wireless terminal 101 encrypts a registration request message 2204 containing the setting identification data with an encryption key (public key) for a registration request and transmits the encrypted registration request message 2204 (FIG. 22) to the access point 104 (Step S2007).

Upon receiving the registration request message 2204 from the wireless terminal 101, the access point 104 decides in Step S2102 that a message has been received. Next, in Step S2103, the access point 104 determines whether the received message is a data frame. In this case, the registration request message 2204 is a data frame, and thus the process of the access point 104 advances to Step S2104 to determine whether the message-sending device has been registered with the first wireless network 110 by the registration manager 314. In this case, it is determined that the message-sending device has not been registered, and the process advances to Step S2107, where it decrypts the received message with an encryption key (secret key) for a registration request. In Step S2108, the access point 104 determines whether the message is a registration request message. If it is determined that the message is a registration request message, the process of the access point 104 advances to Step S2109 to read the timer value from the timer 313. The access point 104 sets the time counted between the start of communication parameter setting and reception of the registration request message 2204 as setting identification data for the access point 104. Next, in Step S2110, the access point 104 compares the setting identification data for the access point 104 and setting identification data of the wireless terminal 101 contained in the registration request message 2204, and thereby determines whether the setting target device has been validated successfully. According to the third embodiment, the validation based on the setting identification data is considered to be successful if the difference between the values of the setting identification data falls within a certain range such as e.g., five seconds (inclusive). Consequently, the process of the access point 104 advances to Step S2111 to encrypt a registration acceptance message 2205 containing an encryption key for communication parameter setting with an encryption key (secret key) for a registration request. In Step S2112, the access point 104 transmits the encrypted registration acceptance message 2205 (FIG. 22) to the wireless terminal 101.

Upon receiving the registration acceptance message 2205 in Step S2008, the process of the wireless terminal 101 advances to Step S2009 to decrypt the received registration acceptance message 2205 with the encryption key for a registration request. In Step S2010, the wireless terminal 101 starts a communication parameter setting sequence 2206 in relation to the access point 104 using the encryption key for communication parameter setting contained in the registration acceptance message 2205. The access point 104 also starts a communication parameter setting sequence 2206 in Step S2113 (FIG. 22).

Subsequently, the same processes as in the first embodiment are performed between the wireless terminal 101 and access point 104 to set the first communication parameters 111 on the wireless terminal 101. Consequently, the wireless terminal 101 is registered with the registration manager 314 of the access point 104 (Step S2114). The wireless terminal 101 can now conduct data communication with devices in the first wireless network 110. During this time, communication between the access point 104 and wireless terminal 107 is maintained as in the case of the first embodiment. In Step S2115, the access point 104 cuts off the wireless link.

According to the third embodiment, if there are a plurality of access points, i.e., if a plurality of different SSID beacons are detected, the wireless terminal 101 transmits a registration request message to all the access points which have transmitted the beacons containing the detected SSIDs. Alternatively, the wireless terminal 101 transmits a registration request message to the access points which have transmitted the beacons containing the detected SSIDs, until communication parameters can be set.

In this way, according to the third embodiment, it is possible to identify the setting target device of communication parameters without synchronizing time between the access point and wireless terminal unlike the first and second embodiments.

<Fourth Embodiment>

According to a fourth embodiment, a password or other authentication information is used as the setting identification data for validation of a setting target device. Incidentally, the password herein includes a PIN (Personal Identification Number) code or other unique information used to identify a user and device.

In the fourth embodiment described below, a password is used as setting identification data. It is assumed that the password has been set on the access point and that the wireless terminal is required to enter the password. Incidentally, the fourth embodiment includes the access point 104, wireless terminal 101, and wireless terminal 107 as in the case of the first embodiment. Also, the wireless terminals and access point according to the fourth embodiment have the same configurations as those shown in the block diagrams in FIGS. 2 and 3.

Next, a method for setting communication parameters according to the fourth embodiment will be described with reference to FIGS. 23 to 25.

Figure 23:
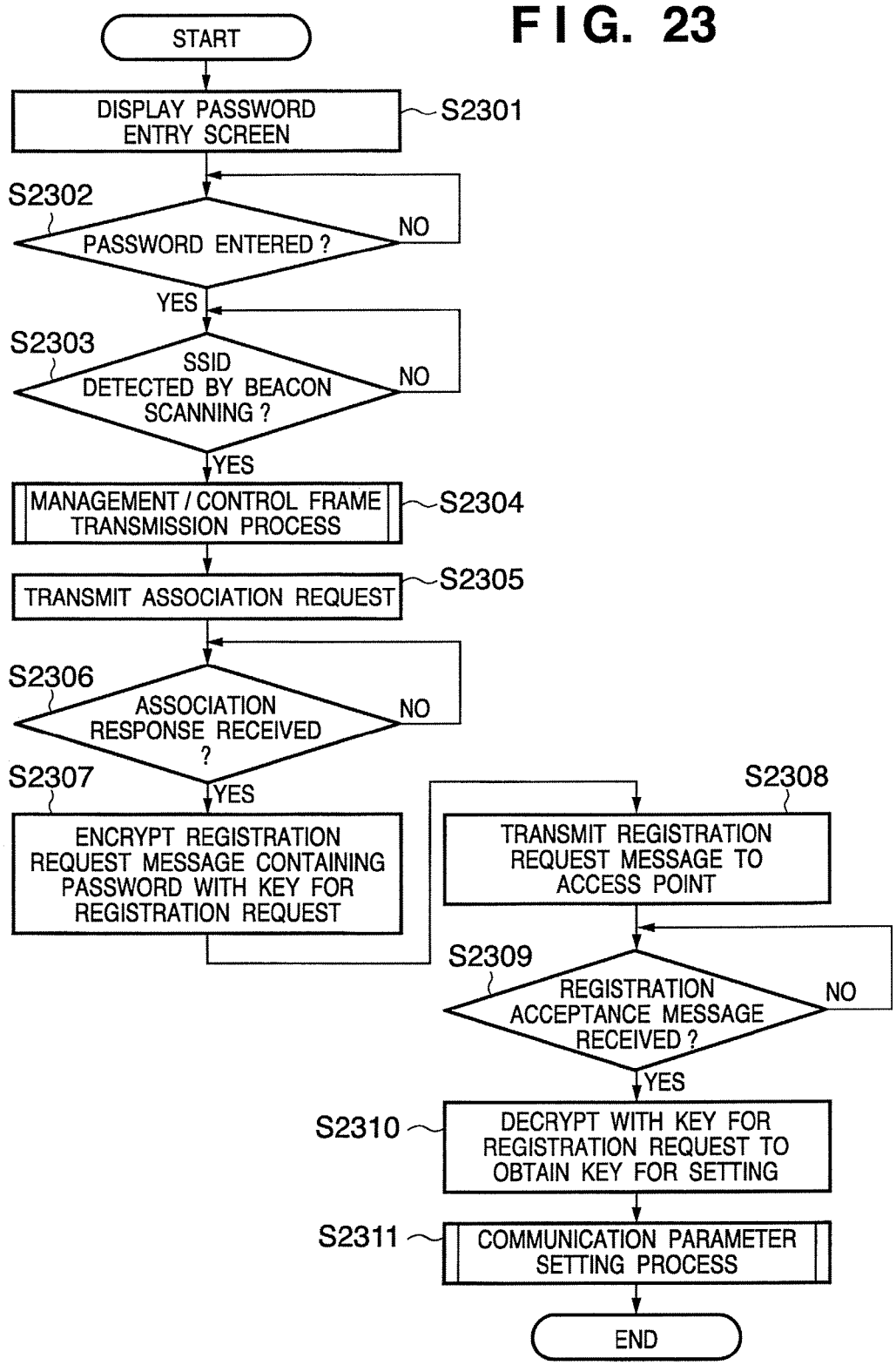
FIG. 23 is a flowchart explaining a communication parameter setting process on a wireless terminal according to a fourth embodiment.

FIG. 23 is a flowchart explaining a communication parameter setting process on the wireless terminal 101 according to the fourth embodiment.

Figure 24:
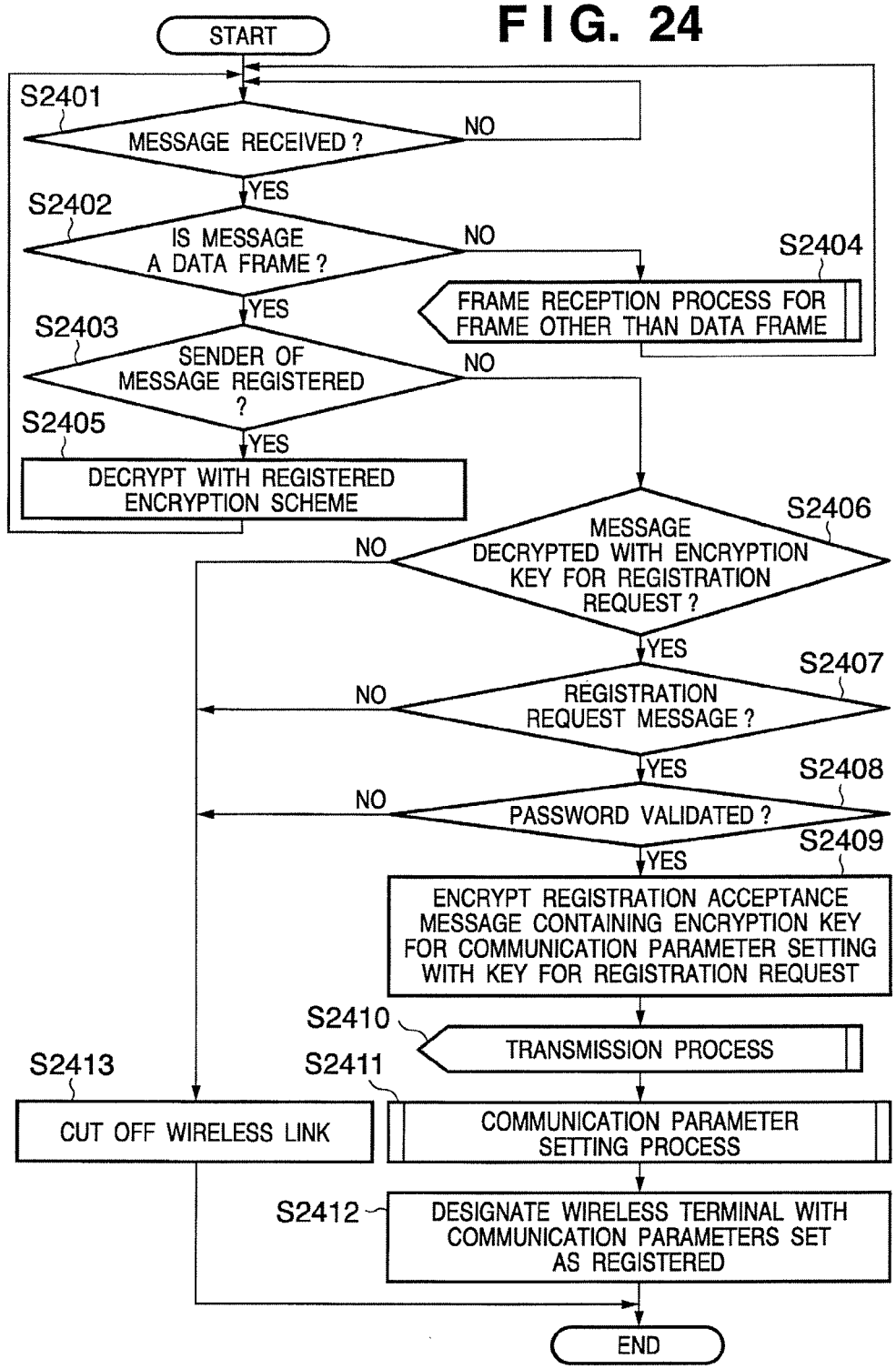
FIG. 24 is a flowchart explaining a communication parameter setting process on an access point according to the fourth embodiment.

FIG. 24 is a flowchart explaining a communication parameter setting process on the access point 104 according to the fourth embodiment.

Figure 25:
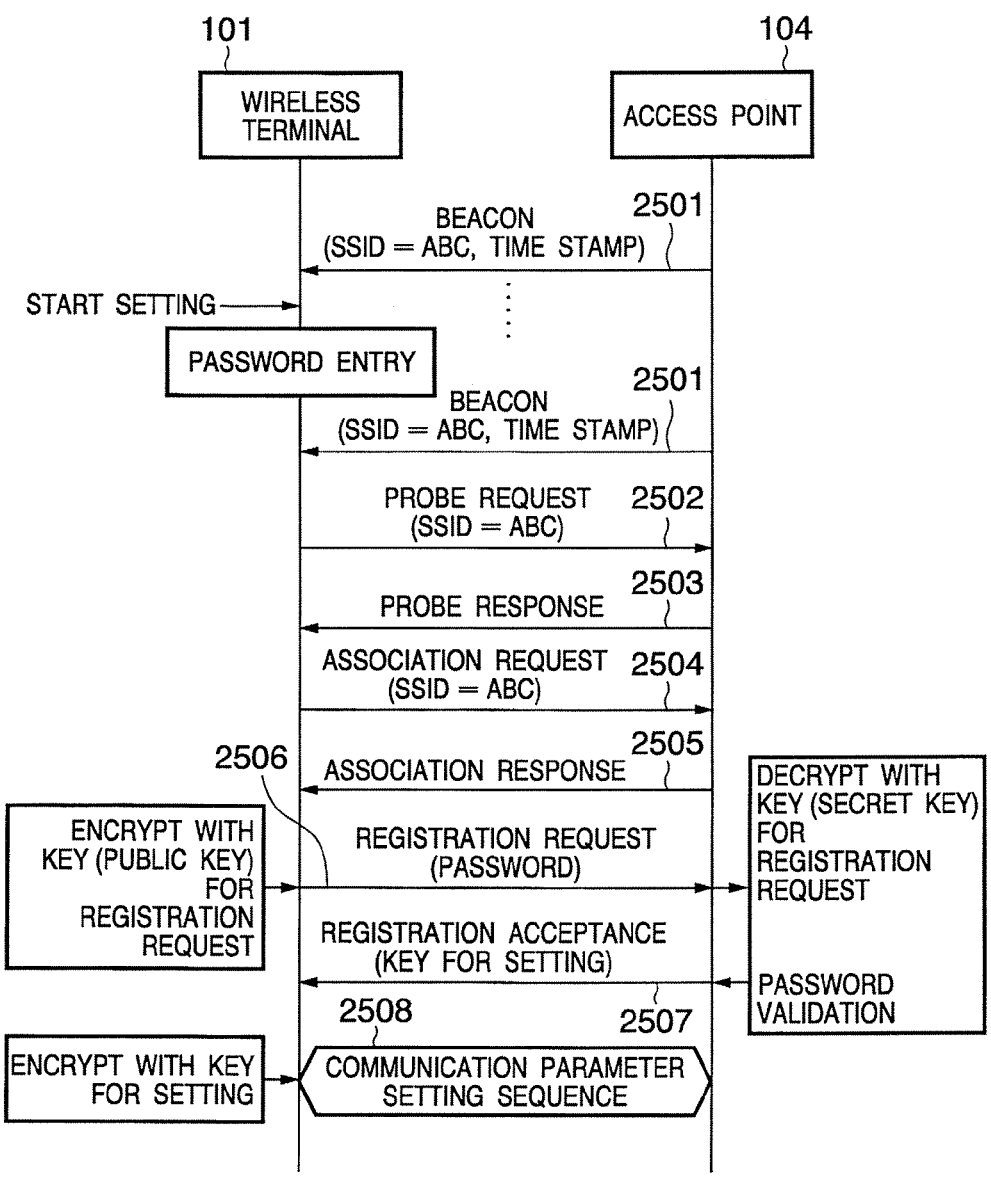
FIG. 25 is a diagram illustrating a communication parameter setting sequence performed between the wireless terminal and access point according to the fourth embodiment.

FIG. 25 is a diagram explaining a communication parameter setting sequence performed between the wireless terminal 101 and access point 104 according to the fourth embodiment. In FIG. 25, 2501 to 2505 are the same as 1101 to 1105 in FIG. 1, and thus a description thereof will be omitted.

The processes according to the fourth embodiment will be described below.

To start setting communication parameters, the user of the wireless terminal 101 presses a communication parameter setting start button 103. Consequently, the flowchart shown in FIG. 23 is started. When the communication parameter setting start button 103 is pressed, the wireless terminal 101 presents a password entry screen on the display unit 209 in Step S2301. In Step S2302, when the user enters a password, the wireless terminal 101 stores the password as setting identification data of the wireless terminal 101 and the process advances to Step S2303, where the wireless terminal 101 starts scanning a beacon. Subsequent processes on the wireless terminal 101 are the same as in the first embodiment except that the setting identification data to be put in a registration request message is the password stored in Step S2302, and thus a description thereof will be omitted.

According to the fourth embodiment, it is not necessary to press the communication parameter setting start button 106 in order for the access point 104 to start setting communication parameters. The flowchart shown in FIG. 24 is always executed.

After a wireless link is established through an association process with the wireless terminal 101, if a registration request message 2506 (FIG. 25) is received from the wireless terminal 101, the process of the access point 104 advances from Step S2401 to Step S2402. In Step S2402, the access point 104 determines whether the received message is a data frame. If the received message is a data frame and the sender of the message is not registered with the registration manager 314, the process of the access point 104 advances from Step S2403 to Step S2406 to determine whether the received message has been decrypted with an encryption key for a registration request. If the message has been decrypted, the access point 104 determines in Step S2407 whether the message is a registration request message. If it is found as a result of the determination that the message is a registration request message, the process of the access point 104 advances to Step S2408 to compare the setting identification data of the wireless terminal 101, i.e., a password, contained in the registration request message 2506 with a password set on the access point 104 in advance. If the passwords match, the access point 104 considers that validation of the setting target device has been successful and the process advances to Step S2409. In Step S2409, the access point 104 encrypts a registration acceptance message 2507 (FIG. 25) containing an encryption key for communication parameter setting with an encryption key (secret key) for a registration request. The access point 104 transmits the encrypted registration acceptance message 2507 to the wireless terminal 101 in Step S2410. Subsequent processes on the access point 104 are the same as in the first embodiment, and thus a description thereof will be omitted.

The first communication parameters 111 are set on the wireless terminal 101 through a communication parameter setting sequence 2508 (FIG. 25) performed between the wireless terminal 101 and access point 104. Consequently, the wireless terminal 101 can now conduct data communication with devices in the first wireless network 110. During this time, communication between the access point 104 and wireless terminal 107 is maintained as in the case of the first embodiment.

If there are a plurality of access points, the wireless terminal 101 transmits a registration request message to all the access points which have transmitted the beacons containing the detected SSIDs. Alternatively, the wireless terminal 101 transmits a registration request message to the access points which have transmitted the beacons containing the detected SSIDs, until communication parameters can be set.

As described above, according to the fourth embodiment, since a setting target device is validated using a password, communication parameter setting may be started only on the wireless terminal without the need to simultaneously start setting the communication parameters on the access point.

Incidentally, the password may be set on the access point at the start of communication parameter setting. In that case, when the communication parameter setting start button 106 is pressed on the access point, a password entry screen may be presented in the display unit 309, allowing the user to enter a password using the console unit 310. This will make it possible to perform the communication parameter setting process even if a password has not been set on the access point in advance.

<Fifth Embodiment>

In the first to fourth embodiments described above, the beacon scanning on the wireless terminal may be performed before communication parameters are set on the wireless terminal.

<Sixth Embodiment>

According to a sixth embodiment, when transmitting data from an access point to a wireless terminal as described in the first to fifth embodiments, the access point determines whether the destination wireless terminal has been registered. If the wireless terminal is yet to be registered, the access point transmits the data at minimum transmission power.

Figure 26:
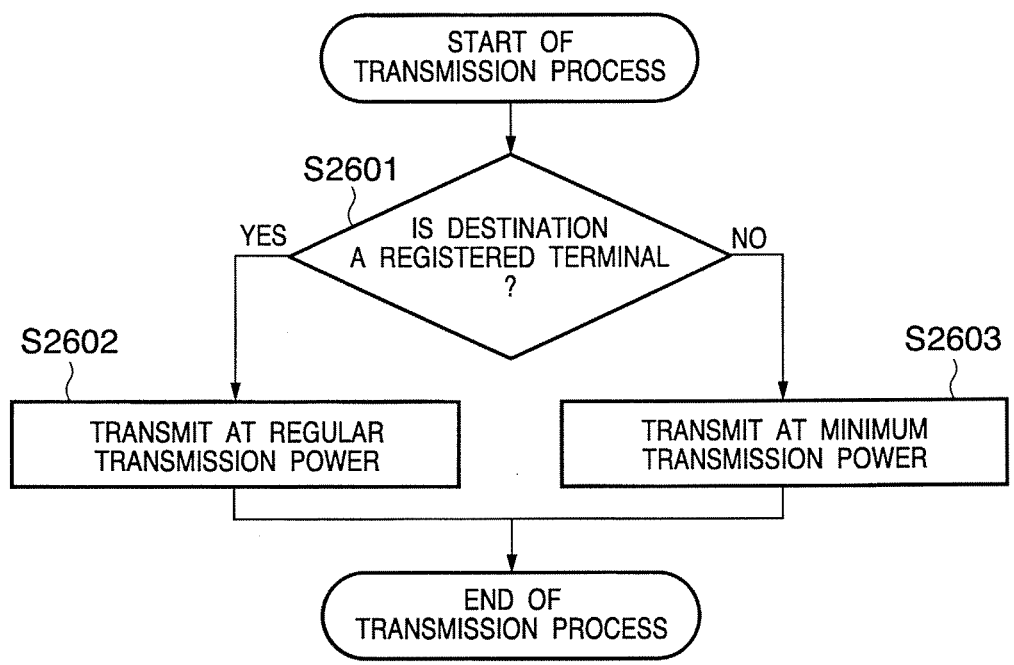
FIG. 26 is a flowchart explaining a data transmission process on an access point according to a sixth embodiment.

FIG. 26 is a flowchart explaining a data transmission process on an access point according to the sixth embodiment.

For data transmission, the access point determines in Step S2601 whether the destination of a message has been registered. If the destination has been registered, the process of the access point advances to Step S2602 to transmit the message at regular transmission power. On the other hand, if the destination device is not registered, the process of the access point advances to Step S2603 to transmit the message at lower transmission electric power than the regular transmission power. Incidentally, in FIG. 26, the transmission electric power is reduced to a minimum as an example.

By reducing the transmission electric power in this way upon transmitting data to an unregistered device, it is possible to reduce the risk of data interception and the like.

<Seventh Embodiment>

The first to sixth embodiments described above may use an encryption/decryption scheme in which the encryption key for a registration request is a common key possessed by the wireless terminal 101 and access point 104 rather than a public key.

<Eighth Embodiment>

The first to seventh embodiments described above may not use an encryption key for a registration request. This will make it possible to set communication parameters for devices which do not have an encryption key for a registration request.

<Ninth Embodiment>

In the first to eighth embodiments, the encryption scheme contained in the communication parameters also includes the case of no encryption scheme.

<Tenth Embodiment>

In the first to ninth embodiments, the encryption scheme contained in the communication parameters transmitted to a newly joining terminal during a communication parameter setting sequence may be varied from device to device instead of being the encryption scheme used for the current communication. By varying the encryption scheme from device to device, it is possible to reduce the risk of the communication parameters being intercepted or falsified during the current communication. This also makes it possible to set the communication parameters even if a newly joining terminal does not support the encryption scheme used for the communication.

<Eleventh Embodiment>

Communication parameter setting performed between access points and wireless terminals has been described in the first to tenth embodiments, but the present invention is also applicable to communication parameter setting performed between wireless terminals without an intervening access point as shown in FIG. 27.

FIG. 27 is a diagram showing a configuration of a wireless communication system according to an eleventh embodiment of the present invention. The same components as those of the other embodiments are denoted by the same reference numerals as the corresponding components of the other embodiments.

On a wireless network 110, a wireless terminal 107 and wireless terminal 2701 are conducting wireless communication directly without an intervening access point (an ad hoc system). The wireless terminal 2701 has a wireless communication unit 2702. When a button 2703 is pressed, the wireless terminal 2701 starts an auto setting process of communication parameters. However, in a case that a password is used as in the case of the fourth embodiment, there is no need to press the button 2703. On the other hand, a wireless terminal 101 is a newly joining terminal of the wireless network 110. That is, the wireless network 110 is judged to be an unregistered device by the wireless terminals 107 and 2701. Also, the wireless terminals 107, 2701, and 101 have encryption keys for a registration request in the form of a secret key and public key.

The rest of the configuration is the same as the first embodiment if the access point 104 is replaced by the wireless terminal 2701, and thus a description thereof will be omitted. In this case, the wireless terminal 2701 will have a registration manager.

<Twelfth Embodiment>

Figure 28:
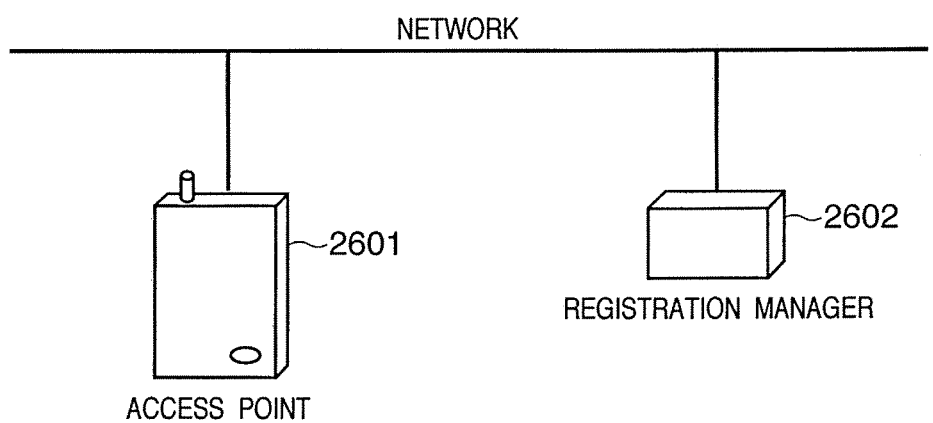
FIG. 28 is a diagram showing a configuration of a wireless communication system according to a twelfth embodiment of the present invention.

In the first to tenth embodiments, the registration manager may be connected via a network as shown in FIG. 28 instead of being installed in an access point. By referring to a registration manager 2602 via a network, an access point 2601 will determine whether a wireless terminal which has transmitted a message has been registered. This configuration eliminates the need to install the registration manager 2602 in the access point 2601. Also, it allows information registered in the registration manager 2602 to be shared by a plurality of access points.

Thus, the embodiments described above make it easy to set communication parameters on a communication apparatus which newly joins a network. They also make it possible to set communication parameters on a newly joining device while continuing ongoing communication with other devices.

Also, since a communication parameter setting process is performed using an encryption key made known to the setting target device of the communication parameters in advance, the communication parameters can be set safely. Besides, since the encryption key is transmitted in encrypted form, it is possible to further improve safety.

(Other Embodiments)

Embodiments of the present invention have been described in detail above, but the present invention may be applied either to a system consisting of two or more devices or to an apparatus consisting of a single device.

Incidentally, the present invention can also be achieved by a configuration in which a software program that implements the functions of the embodiments described above is supplied to a system or apparatus either directly or remotely and a computer in the system or apparatus reads out and executes the supplied program. In that case, the configuration does not necessarily have to take the form of a program as long as it has program functions.

Thus, program code itself installed on the computer to implement functions and processes of the present invention on the computer also implements the present invention. That is, the present invention as defined in the claims also includes the computer program which implements the functions and processes of the present invention. In that case, the program code may take any form including object code, programs executed by an interpreter, and script data supplied to an OS as long as it has program functions.

Recording media available for use to supply programs include, for example, floppy (registered trademark) disks, hard disks, optical disks, magneto-optical disks, MO, CD-ROM, CD-R, CD-RW, magnetic tape, non-volatile memory cards, ROM, DVD (DVD-ROM and DVD-R), etc.

The program can also be supplied via an Internet homepage. In that case, the user is supposed to connect to an Internet homepage using a browser on a client computer and download the program itself of the present invention or a compressed self-installing file onto a recording medium such as a hard disk. Also, the program code of the program according to the present invention may be divided into multiple files, which can be downloaded from respective homepages. That is, the present invention as defined in the claims also includes WWW servers which allow multiple users to download program files capable of implementing the functions and processes of the present invention on a computer.

The present invention may also be distributed to users as a storage medium such as a CD-ROM containing the program of the present invention in encrypted form. In that case, only the users who satisfy predetermined conditions are provided with key information for decryption through a download from an Internet homepage and allowed to decrypt and install the program in executable form on a computer using the key information.

The functions of the above embodiments may be implemented not only by the program read out and executed by the computer, but also, for example, by part or all of the actual processing executed, in accordance with instructions from the program, by an OS running on the computer.

Furthermore, the functions of the above embodiments may also be implemented by part or all of the actual processing executed by a CPU or the like contained in a function expansion board inserted in the computer or a function expansion unit connected to the computer if the processing is performed in accordance with instructions from the program code that has been read out of the storage medium and written into memory on the function expansion board or unit.

While the present invention has been described with reference to an exemplary embodiment, it is understood that the invention is not limited to the disclosed exemplary embodiment. The scope of the following claims is to be accorded the broadest interpretation so as to encompass all such modifications and equivalent structures and functions.

What is claimed is:

1. A communication apparatus comprising:
a processor; and
a memory having instructions that, when executed by the processor, cause the processor to:
 detect a second communication apparatus which is to be a candidate for a process for setting a communication parameter for wireless communication,
 transmit a first signal to the detected second communication apparatus, wherein the first signal includes password information used in an authentication for the process for setting the communication parameter, and
 perform the process for setting the communication parameter with the detected second communication apparatus which responds to the first signal based on the password information,
wherein:
 1) if the processor succeeds in the process for setting the communication parameter with a the second communication apparatus, the processor does not perform the process for setting the communication parameter with communication apparatuses other than the second communication apparatus, and
 2) if the processor fails in the process for setting the communication parameter with the second communication apparatus, in response to the failure, the processor performs the process for setting the communication parameter with a third communication apparatus other than the second communication apparatus.

2. The communication apparatus according to claim 1, wherein the instructions further cause the processor to, while the processor performs the process for setting the communication parameter with the second communication apparatus, restrict transmission of the first signal to the third communication apparatus.

3. The communication apparatus according to claim 1, wherein the first signal is encrypted.

4. The communication apparatus according to claim 1, wherein the communication parameter is used in wireless communication compliant with IEEE802.11 series.

5. The apparatus according to claim 1, wherein the instructions further cause the processor to detect another communication apparatus which is to be a candidate for setting the communication parameter by receiving a second signal from the another communication apparatus.

6. The apparatus according to claim 5, wherein the second signal includes Service Set Identification (SSID).

7. The apparatus according to claim 1, wherein the communication parameter includes at least one of Service Set Identification (SSID), encryption key, or authentication information.

8. A method of controlling a communication apparatus, the method comprising:
  detecting a second communication apparatus which is to be a candidate for a process for setting a communication parameter for wireless communication;
  transmitting a first signal to the detected second communication apparatus, wherein the first signal includes password information used in an authentication in the process for setting the communication parameter; and
  performing the process for setting the communication parameter with the detected second communication apparatus which responds to the first signal based on the password information,
  wherein:
  1) if the process for setting the communication parameter with the second communication apparatus is successful, the process for setting the communication parameter with communication apparatuses other than the second communication apparatus is not performed, and
  2) if the process for setting the communication parameter with the second communication apparatus is unsuccessful, then in response the process for setting the communication parameter with a third communication apparatus other than the first communication apparatus is performed.

9. A non-transitory computer readable storage medium storing program for causing a computer to execute a method of controlling a communication apparatus, the method comprising:
  detecting a second communication apparatus which is to be a candidate for a process for setting a communication parameter for wireless communication;
  transmitting a first signal to the detected second communication apparatus, wherein the first signal includes password information used in an authentication in the process for setting the communication parameter; and
  perform the process for setting the communication parameter with the detected second communication apparatus which responds to the first signal based on the password information,
  wherein:
  1) if the process for setting the communication parameter with the second communication apparatus is successful, the process for setting the communication parameter with communication apparatuses other than the second communication apparatus is not performed, and
  2) if the process for setting the communication parameter with the second communication apparatus is unsuccessful, then in response the process for setting the communication parameter with a third communication apparatus other than the second communication apparatus is performed.

10. A communication apparatus comprising:
  a processor; and
  a memory having instructions that, when executed by the processor, cause the processor to:
    detect a second communication apparatus that is to be a candidate for a process for setting a communication parameter for wireless communication,
    transmit a predetermined signal to the detected second communication apparatus, wherein the predetermined signal includes password information used in an authentication for the process for setting the communication parameter,
    perform the process for setting the communication parameter with the detected second communication apparatus that responds to the predetermined signal based on the password information, and
    if the processor detects a plurality of communication apparatuses that are to be respective candidates for the process for setting the communication parameter, transmit the predetermined signal to ones of the plurality of detected communication apparatuses, respectively, until the processor has set the communication parameter with a respective one of the plurality of detected communication apparatuses.

11. The communication apparatus according to claim 10, wherein the instructions further cause the processor to, while the processor performs the process for setting the communication parameter with the second communication apparatus, restrict transmission of the predetermined signal to communication apparatuses other than the second communication apparatus.

12. The communication apparatus according to claim 10, wherein the predetermined signal is encrypted.

13. The communication apparatus according to claim 10, wherein the communication parameter is used in wireless communication compliant with IEEE802.11 series.

14. The communication apparatus according to claim 10, wherein the instructions further cause the processor to detect another communication apparatus which is to be a candidate for setting the communication parameter by receiving a signal from the another communication apparatus.

15. The communication apparatus according to claim 14, wherein the signal includes Service Set Identification (SSID).

16. The communication apparatus according to claim 10, wherein the communication parameter includes at least one of Service Set Identification (SSID), encryption key, or authentication information.

17. A method of controlling a communication apparatus, the method comprising:
  detecting a second communication apparatus that is to be a candidate for a process for setting a communication parameter for wireless communication;
  transmitting a predetermined signal to the detected second communication apparatus, wherein the predetermined signal includes password information used in an authentication for the process for setting the communication parameter, performing the process for setting the communication parameter with the detected second communication apparatus that responds to the predetermined signal based on the password information; and if a plurality of communication apparatuses that are to be respective candidates for the process for setting the communication parameter are detected, transmitting the predetermined signal to ones of the plurality of detected communication apparatuses, respectively, until the communication parameter is set with a respective one of the plurality of detected communication apparatuses.

18. A non-transitory computer readable storage medium storing program for causing a computer to execute a method of controlling a communication apparatus, the method comprising:

detecting a second communication apparatus that is to be a candidate for a process for setting a communication parameter for wireless communication;

transmitting a predetermined signal to the detected second communication apparatus, wherein the predetermined signal includes password information used in an authentication for the process for setting the communication parameter, performing the process for setting the communication parameter with the detected second communication apparatus that responds to the predetermined signal based on the password information; and if a plurality of communication apparatuses that are to be respective candidates for the process for setting the communication parameter are detected, transmitting the predetermined signal to ones of the plurality of detected communication apparatuses, respectively, until the communication parameter is set with a respective one of the plurality of detected communication apparatuses.

* * * * *